US006933950B2

(12) United States Patent
Kagawa et al.

(10) Patent No.: US 6,933,950 B2
(45) Date of Patent: Aug. 23, 2005

(54) COLOR CONVERSION CHARACTERISTIC DETERMINING METHOD, IMAGE DISPLAY DEVICE, AND RECORDING MEDIUM

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/798,388

(22) Filed: Mar. 12, 2004

(65) Prior Publication Data

US 2004/0169659 A1 Sep. 2, 2004

Related U.S. Application Data

(62) Division of application No. 09/919,823, filed on Aug. 2, 2001, now Pat. No. 6,717,585.

(30) Foreign Application Priority Data

Jan. 17, 2001 (JP) ........................................ 2001-009257

(51) Int. Cl.[7] ................................................ G09G 5/02
(52) U.S. Cl. ...................... 345/600; 345/589; 345/591; 345/593; 345/603; 345/604; 358/500; 382/167
(58) Field of Search ................................ 345/589, 591, 345/593, 600, 603, 604; 358/500; 382/167

(56) References Cited

U.S. PATENT DOCUMENTS

| 4,740,833 | A | | 4/1988 | Shiota et al. |
| 4,887,150 | A | * | 12/1989 | Chiba et al. ................. 358/523 |
| 4,989,079 | A | | 1/1991 | Ito |
| 5,436,733 | A | | 7/1995 | Terada et al. |
| 5,659,406 | A | | 8/1997 | Imao et al. |
| 5,933,252 | A | | 8/1999 | Emori et al. |
| 6,125,202 | A | | 9/2000 | Kagawa et al. |
| 6,434,268 | B1 | | 8/2002 | Asamura et al. |
| 2002/0168103 | A1 | * | 11/2002 | Shiraiwa ..................... 382/167 |

FOREIGN PATENT DOCUMENTS

| EP | 1028586 A | 8/2000 |
| JP | 63-39188 | 8/1988 |
| JP | 63-227181 | 9/1988 |
| JP | 2-30226 | 7/1990 |
| JP | 5-48885 A | 2/1993 |
| JP | 5-183742 | 7/1993 |
| JP | 7-023245 | 1/1995 |
| JP | 7-170404 | 4/1995 |
| JP | 8-321964 | 12/1996 |
| JP | 11-17974 | 1/1999 |

* cited by examiner

*Primary Examiner*—Matthew C. Bella
*Assistant Examiner*—Tam Tran
(74) *Attorney, Agent, or Firm*—Birch, Stewart, Kolasch, & Birch, LLP

(57) ABSTRACT

In a color conversion characteristic determining method for use with an image display device in which image data is converted on a pixel-by-pixel basis, referring to the color conversion characteristic, and the color-converted image is displayed, a color conversion characteristic candidate is set, and color-converted data are predicted by using input image data, and then tristimulus values of the displayed colors are predicted, and the results are evaluated to judge whether the color conversion characteristic satisfies the requirement. It is possible to make the color conversion characteristic to obtain color reproduction closer to the ideal color reproduction according to a standard, and the color conversion characteristic can be determined in a short time.

13 Claims, 11 Drawing Sheets

FIG.7

| DATA No. | INPUT DATA | | |
|---|---|---|---|
| | R | G | B |
| 1 | 0 | 0 | 0 |
| 2 | 16 | 0 | 0 |
| 3 | 32 | 0 | 0 |
| 4 | 64 | 0 | 0 |
| 5 | 96 | 0 | 0 |
| 6 | 128 | 0 | 0 |
| 7 | 160 | 0 | 0 |
| 8 | 192 | 0 | 0 |
| 9 | 224 | 0 | 0 |
| 10 | 240 | 0 | 0 |
| 11 | 255 | 0 | 0 |
| 12 | 0 | 16 | 0 |
| 13 | 0 | 32 | 0 |
| 14 | 0 | 64 | 0 |
| 15 | 0 | 96 | 0 |
| 16 | 0 | 128 | 0 |
| 17 | 0 | 160 | 0 |
| 18 | 0 | 192 | 0 |
| 19 | 0 | 224 | 0 |
| 20 | 0 | 240 | 0 |
| 21 | 0 | 255 | 0 |
| 22 | 0 | 0 | 16 |
| 23 | 0 | 0 | 32 |
| 24 | 0 | 0 | 64 |
| 25 | 0 | 0 | 96 |
| 26 | 0 | 0 | 128 |
| 27 | 0 | 0 | 160 |
| 28 | 0 | 0 | 192 |
| 29 | 0 | 0 | 224 |
| 30 | 0 | 0 | 240 |
| 31 | 0 | 0 | 255 |
| 32 | 64 | 64 | 64 |
| 33 | 128 | 64 | 64 |
| 34 | 192 | 64 | 64 |
| 35 | 255 | 64 | 64 |
| 36 | 64 | 128 | 64 |
| 37 | 128 | 128 | 64 |
| 38 | 192 | 128 | 64 |
| 39 | 255 | 128 | 64 |
| 40 | 64 | 192 | 64 |
| 41 | 128 | 192 | 64 |
| 42 | 192 | 192 | 64 |
| 43 | 255 | 192 | 64 |
| 44 | 64 | 255 | 64 |
| 45 | 128 | 255 | 64 |
| 46 | 192 | 255 | 64 |
| 47 | 255 | 255 | 64 |
| 48 | 64 | 64 | 128 |
| 49 | 128 | 64 | 128 |
| 50 | 192 | 64 | 128 |
| 51 | 255 | 64 | 128 |
| 52 | 64 | 128 | 128 |
| 53 | 128 | 128 | 128 |
| 54 | 192 | 128 | 128 |
| 55 | 255 | 128 | 128 |
| 56 | 64 | 192 | 128 |
| 57 | 128 | 192 | 128 |
| 58 | 192 | 192 | 128 |
| 59 | 255 | 192 | 128 |
| 60 | 64 | 255 | 128 |

| DATA No. | INPUT DATA | | |
|---|---|---|---|
| | R | G | B |
| 61 | 128 | 255 | 128 |
| 62 | 192 | 255 | 128 |
| 63 | 255 | 255 | 128 |
| 64 | 64 | 64 | 192 |
| 65 | 128 | 64 | 192 |
| 66 | 192 | 64 | 192 |
| 67 | 255 | 64 | 192 |
| 68 | 64 | 128 | 192 |
| 69 | 128 | 128 | 192 |
| 70 | 192 | 128 | 192 |
| 71 | 255 | 128 | 192 |
| 72 | 64 | 192 | 192 |
| 73 | 128 | 192 | 192 |
| 74 | 192 | 192 | 192 |
| 75 | 255 | 192 | 192 |
| 76 | 64 | 255 | 192 |
| 77 | 128 | 255 | 192 |
| 78 | 192 | 255 | 192 |
| 79 | 255 | 255 | 192 |
| 80 | 64 | 64 | 255 |
| 81 | 128 | 64 | 255 |
| 82 | 192 | 64 | 255 |
| 83 | 255 | 64 | 255 |
| 84 | 64 | 128 | 255 |
| 85 | 128 | 128 | 255 |
| 86 | 192 | 128 | 255 |
| 87 | 255 | 128 | 255 |
| 88 | 64 | 192 | 255 |
| 89 | 128 | 192 | 255 |
| 90 | 192 | 192 | 255 |
| 91 | 255 | 192 | 255 |
| 92 | 64 | 255 | 255 |
| 93 | 128 | 255 | 255 |
| 94 | 192 | 255 | 255 |
| 95 | 255 | 255 | 255 |
| 96 | 32 | 32 | 0 |
| 97 | 96 | 96 | 0 |
| 98 | 160 | 160 | 0 |
| 99 | 224 | 224 | 0 |
| 100 | 32 | 0 | 32 |
| 101 | 96 | 0 | 96 |
| 102 | 160 | 0 | 160 |
| 103 | 224 | 0 | 224 |
| 104 | 0 | 32 | 32 |
| 105 | 0 | 96 | 96 |
| 106 | 0 | 160 | 160 |
| 107 | 0 | 224 | 224 |
| 108 | 32 | 32 | 32 |
| 109 | 96 | 96 | 96 |
| 110 | 160 | 160 | 160 |
| 111 | 224 | 224 | 224 |
| 112 | 255 | 240 | 240 |
| 113 | 240 | 255 | 240 |
| 114 | 240 | 240 | 255 |
| 115 | 240 | 255 | 255 |
| 116 | 255 | 240 | 255 |
| 117 | 255 | 255 | 240 |
| 118 | 255 | 224 | 224 |
| 119 | 224 | 255 | 224 |
| 120 | 224 | 224 | 255 |

| DATA No. | INPUT DATA | | |
|---|---|---|---|
| | R | G | B |
| 121 | 224 | 255 | 255 |
| 122 | 255 | 224 | 255 |
| 123 | 255 | 255 | 224 |
| 124 | 255 | 16 | 0 |
| 125 | 255 | 0 | 16 |
| 126 | 255 | 16 | 16 |
| 127 | 16 | 255 | 0 |
| 128 | 0 | 255 | 16 |
| 129 | 16 | 255 | 16 |
| 130 | 16 | 0 | 255 |
| 131 | 0 | 16 | 255 |
| 132 | 16 | 16 | 255 |
| 133 | 255 | 255 | 16 |
| 134 | 255 | 240 | 0 |
| 135 | 240 | 255 | 0 |
| 136 | 255 | 16 | 255 |
| 137 | 240 | 0 | 255 |
| 138 | 255 | 0 | 240 |
| 139 | 16 | 255 | 255 |
| 140 | 0 | 240 | 255 |
| 141 | 0 | 255 | 240 |
| 142 | 255 | 32 | 0 |
| 143 | 255 | 0 | 32 |
| 144 | 255 | 32 | 32 |
| 145 | 32 | 255 | 0 |
| 146 | 0 | 255 | 32 |
| 147 | 32 | 255 | 32 |
| 148 | 32 | 0 | 255 |
| 149 | 0 | 32 | 255 |
| 150 | 32 | 32 | 255 |
| 151 | 255 | 255 | 32 |
| 152 | 255 | 224 | 0 |
| 153 | 224 | 255 | 0 |
| 154 | 255 | 32 | 255 |
| 155 | 224 | 0 | 255 |
| 156 | 255 | 0 | 224 |
| 157 | 32 | 255 | 255 |
| 158 | 0 | 224 | 255 |
| 159 | 0 | 255 | 224 |

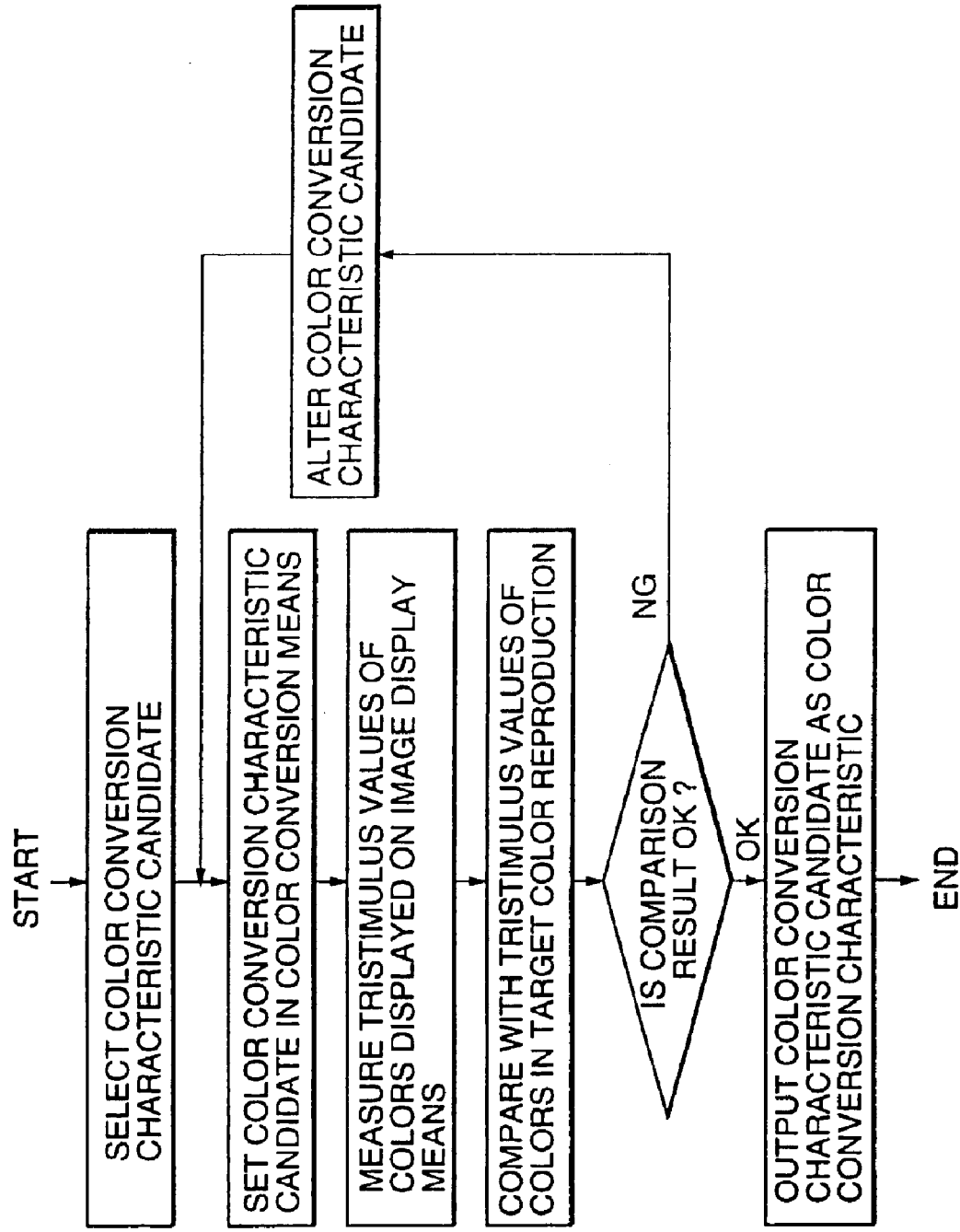

COLOR CONVERSION CHARACTERISTIC DETERMINING METHOD, IMAGE DISPLAY DEVICE, AND RECORDING MEDIUM

This application is a Divisional of Application Ser. No. 09/919,823, filed on Aug. 2, 2001 and issued as U.S. Pat. No. 6,717,585 B2 on Apr. 6, 2004, for which priority is claimed under 35 U.S.C. §120; and this application claims priority of Application Ser. No. JP 009257/01 filed in Japan on Jan. 17, 2001 under 35 U.S.C. §119; the entire contents of all are hereby incorporated by reference.

BACKGROUND OF THE INVENTION

The present invention relates to a method of determining the color conversion characteristic of an image display device, such as a monitor, which displays color images, and which has a color conversion means converting, on a pixel-by-pixel basis, image data, referring to the color conversion characteristic. The invention also relates to an image display device having a color conversion means using the color conversion characteristic determined by such a color conversion characteristic determining method.

A conventional method of determining color conversion characteristic in an image display device is first described with reference to FIG. 10. FIG. 10 shows the configuration of a device using an image adjustment method disclosed in Japanese Patent Kokai Publication No. H5-48885. In FIG. 10, reference numeral 104 denotes a keyboard, 105 denotes a mouse, 106 denotes an input means, 107 denotes a controller, 108 denotes an input circuit, 109 denotes a memory, 110 denotes a CPU, 111 denotes an output circuit, 112 denotes an image display unit, 113 denotes an original image, 114a to 114h denote processed images, 115 denotes set parameters, and 116 denotes a hardcopy device. The keyboard 104 and the mouse 105 are examples of input means 106. The controller 107 comprises the input circuit 108 connected to the input means 106, the memory 109, the CPU 110, and the output circuit 111. The image display unit 112 is driven by the output circuit 111.

The illustrated color conversion characteristic determining method simulates the operation of the hardcopy device, and displays the image output from the hardcopy device on the image display device, and permits determination of the optimum color conversion characteristic for the hardcopy device, while observing the simulated images displayed on the image display device. The conventional method relates to a hardcopy device, but the concept of the color conversion characteristic determining method can be applied to image display devices. The operation of the color conversion characteristic determining method of FIG. 10 will next be described.

The memory 109 stores a color conversion simulation program. The CPU 110 executes the program stored in the memory 109. First, image data used for the color conversion simulation is input. The input image data is displayed on the screen of the image display unit 112. Then, the specific manner of processing is input by the use of the input means 106, and the color conversion simulated by the hardcopy device 116 is performed on the input image data, according to the designated manner of processing. The color-converted, processed images 114a to 114h are displayed on the screen of the image display unit 112, together with the original image 113. When the parameters for the color conversion are changed in multiple steps, the processed images are displayed together, arranged in an array. By selecting the processed image which is closest to the original image 113, the optimum parameters, i.e., the optimum conversion characteristic can be determined. When a plurality of color conversion parameters are determined, the operation similar to that described above is repeated for each of the parameters to determine the value of each of the parameters, in turn. The-thus determined color conversion parameters are sent to the hardcopy device.

The above color conversion characteristic determining method simulates the color conversion according to the specific manner of processing, designated by the input means 106, and permits the selection of the optimum image among the plurality of processed images, to thereby determine the color conversion parameters, i.e., the color conversion characteristic, so that it has an advantage that the operator can determine the color conversion parameters, i.e., the color conversion characteristic easily.

However, because the color conversion characteristic is determined according to the visual perception of the operator, it is not suitable for the determination of the color conversion characteristic for bringing the color reproduction closer to that of the standard, such as the sRGB standard, or NTSC standard. Moreover, the operator needs to have a clear idea of the image in the target color reproduction. If the target color reproduction is given in terms of numerical values, such as the chromaticity of the three primary colors, or the chromaticity of the white, then the operator cannot select the suitable one from among those obtained by simulation.

If the target color reproduction is given only in terms of numerical values, such as the chromaticity of the three primary colors, or the chromaticity of white, the method shown in FIG. 11 may be used. FIG. 11 shows a color conversion characteristic determining method which can be applied to an image display device including a color conversion characteristic holding means holding the color conversion characteristic, a color conversion means converting, on a pixel-by-pixel basis, the image data referring to the color conversion characteristic, and an image display means displaying the image data obtained by the color conversion at the color conversion means. This method is described next.

First, a color conversion characteristic candidate which is a candidate for the color conversion characteristic ultimately adopted is selected. Then, the color conversion characteristic candidate is set in the color conversion characteristic holding means. Then, tristimulus values according to the XYZ color system are measured for the colors displayed on the image display means, for each of a predetermined number of the image data (data having the same color throughout the screen). On the other hand, tristimulus values in the target color reproduction for the corresponding image data are calculated. The tristimulus values obtained by measurement and the tristimulus values obtained by calculation are compared. If the result of the comparison indicates "NG (the predetermined condition is not satisfied)" a new color conversion characteristic candidate is selected, and set in the color conversion characteristic holding means. If the result of the comparison indicates "OK (the predetermined condition is satisfied)", then the color conversion characteristic candidate being used is output as the color conversion characteristic, and the processing for determining the color conversion characteristic is terminated.

For the measurement of the tristimulus values of the colors displayed on the image display means, it takes several seconds for each color. In the case of a high-precision measurement, it takes one minute or longer for each color.

If the measurement is performed for each of 60 kinds (60 colors) of image data, and the tristimulus values are measured for each color, and it takes 10 seconds for each color, then it takes 10 minutes for the 60 colors. If the selection of the color conversion characteristic candidate through the comparison of the tristimulus values are repeated 50 times, the total time required is 500 minutes. The total time required for the determination is the sum of the time required for the measurement, and the time required for other works. When a high-precision measurement is performed, or when it is necessary to measure the tristimulus values of the colors displayed for a greater number of image data, or if it is necessary to repeat the selection of the color conversion characteristic candidate through the comparison of the tristimulus values a greater number of times, then even a longer time is required.

Thus, in the method in which a color conversion characteristic candidate is set in the color conversion characteristic holding means, and the tristimulus values of displayed colors are measured, it takes a long time for the determination of the color conversion characteristic, including the time for measurement of the tristimulus values of displayed colors.

SUMMARY OF THE INVENTION

The present invention has been made to solve the problems described above, and its object is to provide a color conversion characteristic determining method by which it is possible to determine the color conversion characteristic for bringing the color reproduction close to the ideal color reproduction according to the standard, and by which it is possible to determine the color conversion characteristic in a short time.

Another object of the invention is to provide an image display device using the color conversion characteristic determined by the above-mentioned color conversion characteristic determining method.

According to one aspect of the invention, there is provided a color conversion characteristic determining method for use with an image display device including a color conversion characteristic holding means holding a color conversion characteristic; a color conversion means converting, on a pixel-by-pixel basis, an image data represented by three or more colors, referring to said color conversion characteristic; and an image display means performing display based on the image data color-converted by said color conversion means; said method comprising the steps of:

(a) setting a conversion characteristic candidate, which is a candidate of said color conversion characteristic;
(b) generating sets of predetermined input image data;
(c) determining, using the color conversion characteristic candidate that has been set, predicted color-converted data, which are predicted values of the data output from said color conversion means when said input image data are input;
(d) determining predicted tristimulus values, which are predicted values of tristimulus values of the colors that are displayed on said image display means when said predicted color-converted data are supplied; and
(e) evaluating said predicted tristimulus values;

wherein said steps (c), (d) and (e) are repeated after determining a new color conversion characteristic candidate when said predicted tristimulus values are not found to satisfy a predetermined condition as a result of the evaluation of said predicted tristimulus values, and said color conversion characteristic candidate then being used is adopted as said color conversion characteristic, when said predicted tristimulus values are found to satisfy the predetermined condition.

With the above arrangement, the tristimulus values of colors are determined by prediction calculation, so that it is not necessary to measure the tristimulus values of colors displayed on the image display means each time the color conversion characteristic candidate is set (initially set or altered), and the tristimulus values of colors displayed on the image display means need to be measured only when the characteristic of the image display means used for the prediction calculation is determined. Accordingly, the time required for the determination of the color conversion characteristic can be reduced substantially. Moreover, the color conversion characteristic is determined by comparing the predicted tristimulus values and the tristimulus values in the target color reproduction, it is possible to determine the color conversion characteristic realizing a color reproduction close to the ideal color reproduction according to sRGB, NTSC or like standard. For this reason, even when the operator does not have a clear idea of the image in the target color reproduction, it is possible to determine the color conversion characteristic.

Said step (d) of determining said predicted tristimulus values may include the steps of:

(d1) determining predicted image display data which are predicted values of the data input to said image display means, based on said predicted color-converted data; and
(d2) determining predicted tristimulus values which are predicted values of tristimulus values of colors displayed on said image display means, based on said predicted image display data.

With the above arrangement, it is possible to determine the color conversion characteristic even when the color-converted data output from the color conversion means and the image display data input to the image display means are different from each other.

Said predicted image display data and said predicted color-converted data may be identical to each other.

With the above arrangement, when the color-converted data output from the color conversion means and the image display data input to the image display means are identical to each other (for example, when the output of the color conversion means are supplied to the image display means without alteration) the color conversion characteristic can be determined.

Said step (e) of evaluating said predicted tristimulus values may include the steps of:

(e1) determining target tristimulus values which are tristimulus values in the target color reproduction characteristic, based on said input image data;
(e2) determining color differences between said predicted tristimulus values and said target tristimulus values; and
(e3) comparing the color differences between said predicted tristimulus values and said target tristimulus values as determined at said step (e2), with a predetermined reference value.

With the above arrangement, it is possible to evaluate the predicted tristimulus values, using the color differences. As a result, it is possible to determine the color conversion characteristic, without relying on the operator's subjective evaluation (evaluation by means of the sense of sight).

Said tristimulus values may be tristimulus values according to XYZ color system.

With the above arrangement, it is possible to determine the color conversion characteristic using tristimulus values according to the XYZ color system which is widely used.

The color differences between said predicted tristimulus values and said target tristimulus values may be the color differences determined by the color difference formula according to the CIE1976 L*a*b* color system.

With the above arrangement, it is possible to evaluate the color differences using the color difference formula according to the CIE1976 L*a*b* color system representing a uniform color space, which is widely used for calculation of the color difference.

The color differences between said predicted tristimulus values and said target tristimulus values may be color differences determined by the CIE1994 color difference formula.

With the above arrangement, it is possible to evaluate the color differences using the CIE1994 color difference formula, the color differences determined thereby being generally coinciding closely in magnitude with those by the sense of sight.

Said step (d2) of calculating said predicted tristimulus values may include the steps of:

(d21) calculating predicted monochromatic tristimulus values which are predicted values of said tristimulus values of colors displayed on said image display means, based on each monochromatic component of said predicted image display data; and (d22) calculating said predicted tristimulus values, using said predicted monochromatic tristimulus values.

With the above arrangement, it is possible to determine the predicted tristimulus values accurately.

Said step (d21) of calculating said predicted monochromatic tristimulus values may include calculating the predicted monochromatic tristimulus values according to a higher-order polynomial using said predicted image display data.

With the above arrangement, it is possible to calculate the predicted monochromatic tristimulus values accurately.

Said step of calculating said predicted monochromatic tristimulus values may include calculating the predicted monochromatic tristimulus values $Xr, Yr, Zr, Xg, Yg, Zg, Xb, Yb, Zb$, according to the following formulae (1) to (3), using said predicted image display data $R1, G1, B1$, and coefficients $ARij, AGij, Abij$ ($i=1$ to 3, $j=1$ to $n$, $n$ being an integer not smaller than 3).

$$\begin{bmatrix} Xr \\ Yr \\ Zr \end{bmatrix} = (ARij) \begin{bmatrix} R1^n \\ R1^{n-1} \\ \vdots \\ R1^2 \\ R1 \\ 1 \end{bmatrix} \quad (1)$$

$$\begin{bmatrix} Xg \\ Yg \\ Zg \end{bmatrix} = (AGij) \begin{bmatrix} G1^n \\ G1^{n-1} \\ \vdots \\ G1^2 \\ G1 \\ 1 \end{bmatrix} \quad (2)$$

$$\begin{bmatrix} Xb \\ Yb \\ Zb \end{bmatrix} = (ABij) \begin{bmatrix} B1^n \\ B1^{n-1} \\ \vdots \\ B1^2 \\ B1 \\ 1 \end{bmatrix} \quad (3)$$

With the above arrangement, it is possible to determine the predicted monochromatic tristimulus values accurately, using simple formulae consisting of multiplications and additions.

Said step (d22) of calculating said predicted tristimulus values from said predicted monochromatic tristimulus values includes calculating the predicted tristimulus values according to polynomials using said predicted monochromatic tristimulus values.

With the above arrangement, it is possible to calculate the predicted tristimulus values accurately using the predicted monochromatic tristimulus values.

Said step (d22) of calculating said predicted tristimulus values from said predicted monochromatic tristimulus values may include calculating the predicted tristimulus values $X, Y, Z$ according to the following formula (4) using said predicted monochromatic tristimulus values $Xr, Yr, Zr, Xg, Yg, Zg, Xb, Yb, Zb$, and coefficients $Eik$ ($i=1$ to 3, $k=1$ to 30).

$$\begin{bmatrix} X \\ Y \\ Z \end{bmatrix} = (Eik) \begin{bmatrix} Xr \\ Xg \\ Xb \\ Xr^2 \\ Xg^2 \\ Xb^2 \\ Xr \times Xg \\ Xg \times Xb \\ Xb \times Xr \\ Xr \times Xg \times Xb \\ Yr \\ Yg \\ Yb \\ Yr^2 \\ Yg^2 \\ Yb^2 \\ Yr \times Yg \\ Yg \times Yb \\ Yb \times Yr \\ Yr \times Yg \times Yb \\ Zr \\ Zg \\ Zb \\ Zr^2 \\ Zg^2 \\ Zb^2 \\ Zr \times Zg \\ Zg \times Zb \\ Zb \times Zr \\ Zr \times Zg \times Zb \end{bmatrix} + \begin{bmatrix} Xbk \\ Ybk \\ Zbk \end{bmatrix} \quad (4)$$

With the above arrangement, it is possible to calculate the predicted tristimulus values accurately using simple formulae consisting of multiplications and additions.

Said step (d22) of calculating said predicted tristimulus values from said predicted monochromatic tristimulus values includes calculating predicted tristimulus values $X, Y, Z$ according to the following formula (5) using said predicted monochromatic tristimulus values $Xr, Yr, Zr, Xg, Yg, Zg, Xb, Yb, Zb$, and coefficients $Eik$ ($i=1$ to 3, $k=1$ to 39).

$$\begin{bmatrix} X \\ Y \\ Z \end{bmatrix} = (Eik) \begin{bmatrix} Xr \\ Xg \\ Xb \\ Xr^2 \\ Xg^2 \\ Xb^2 \\ Xr \times Xg \\ Xg \times Xb \\ Xb \times Xr \\ \sqrt{Xr \times Xg} \\ \sqrt{Xg \times Xb} \\ \sqrt{Xb \times Xr} \\ Xr \times Xg \times Xb \\ Yr \\ Yg \\ Yb \\ Yr^2 \\ Yg^2 \\ Yb^2 \\ Yr \times Yg \\ Yg \times Yb \\ Yb \times Yr \\ \sqrt{Yr \times Yg} \\ \sqrt{Yg \times Yb} \\ \sqrt{Yb \times Yr} \\ Yr \times Yg \times Yb \\ Zr \\ Zg \\ Zb \\ Zr^2 \\ Zg^2 \\ Zb^2 \\ Zr \times Zg \\ Zg \times Zb \\ Zb \times Zr \\ \sqrt{Zr \times Zg} \\ \sqrt{Zg \times Zb} \\ \sqrt{Zb \times Zr} \\ Zr \times Zg \times Zb \end{bmatrix} + \begin{bmatrix} Xbk \\ Ybk \\ Zbk \end{bmatrix} \quad (5)$$

With the above arrangement, it is possible to calculate the predicted tristimulus values more accurately using formulae including calculation of the square roots.

According another aspect of the invention, there is provided an image display device including a color conversion characteristic holding means (3) holding color conversion characteristic; a color conversion means (2) converting, on pixel-by-pixel basis, image data represented by three or more colors, referring to said color conversion characteristic; and an image display means (5) performing display of the image data obtained by color conversion at said color conversion means (2);

wherein color conversion characteristic determined in accordance with the above-described method are held in said color conversion characteristic holding means.

With the above arrangement, it is possible to reduce the time required for determining the color conversion characteristic substantially. Moreover, if the color conversion characteristic is determined by comparing the tristimulus values in the target color reproduction, and the predicted tristimulus values, it is possible to determine the color conversion characteristic realizing a color reproduction close to the ideal color reproduction according to the sRGB, NTSC or like standard. Moreover, it is possible to determine the color conversion characteristic even when the operator does not have a clear idea of the image in the target color reproduction.

According to a further aspect of the invention, there is provided a recording medium which can be read by a computer system, and which stores a computer program for causing a computer system to implement the above-described method.

With the above arrangement, it is possible to have a computer system implement the above-described method.

BRIEF DESCRIPTION OF THE DRAWINGS

In the accompanying drawings:

FIG. 7 is a diagram showing the R, G and B signal values for 159 colors used for calculation of the color difference;

FIG. 11 is a diagram showing another example of color conversion characteristic determining method which is different from the present invention.

DETAILED DESCRIPTION OF THE PREFERRED EMBODIMENTS

Embodiments of the invention will now be described with reference to the accompanying drawings.
Embodiment 1.

Figure 1:
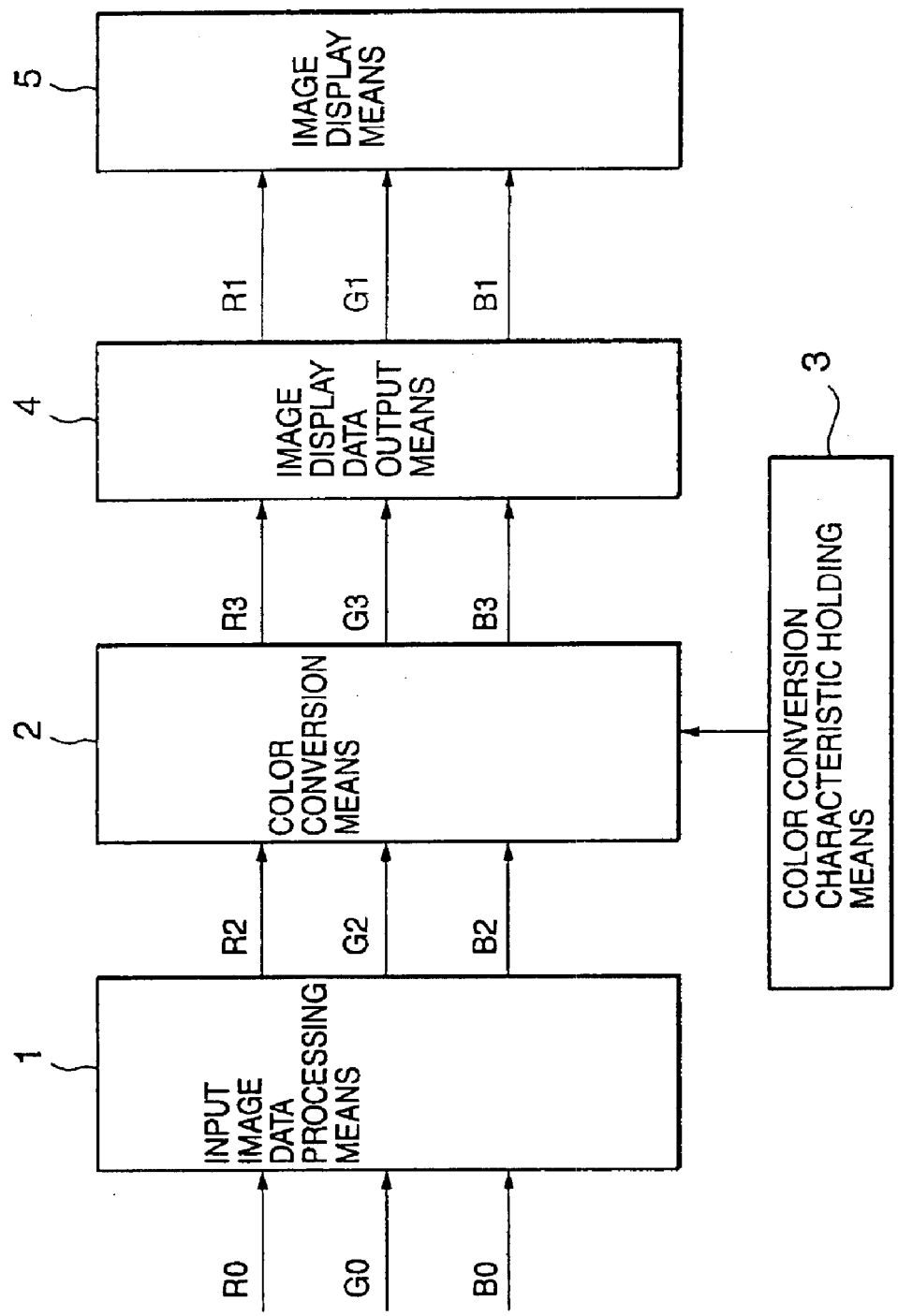
FIG. 1 is a block diagram showing an example of an image display device displaying images using the color conversion characteristic calculated by the color conversion characteristic determining method according to Embodiment 1 of the present invention.

FIG. 1 is a block diagram showing an example of an image display device which displays images using the color conversion characteristic determined by a color conversion characteristic determining method according to the present embodiment. In FIG. 1, reference numeral 1 denotes an input image data processing means, 2 denotes a color conversion means, 3 denotes a color conversion characteristic holding means, 4 denotes an image display data output means, and 5 denotes an image display means.

Input to the input image data processing means 1 are image data R0, G0, B0 formed of three color data. The input image data R0, G0, B0 are subjected to input image processing at the input image data processing means 1, and are output as input-processed image data R2, G2, B2 formed of three color data. The input image processing may involve tone correction processing suitable for the characteristic of the input image data. The input-processed image data R2, G2, B2 output from the input image data processing means 1 are input to the color conversion means 2.

The color conversion characteristic holding means 3 holds the color conversion characteristic calculated by a color conversion characteristic determining method according to the present embodiment, as will be described later. The color conversion means 2 performs color conversion on the input-processed image data R2, G2, B2, using the color conversion characteristic stored in the color conversion characteristic holding means 3, and determines and outputs color-converted data R3, G3, B3 formed of three color data. The color conversion processing performed at the color conversion means 2 may be one using a look-up table, or one using a matrix calculation.

The color conversion means 2 and the color conversion characteristic holding means 3 may be those disclosed in Japanese Patent Application No. 326005/99. The color conversion means shown in Application No. 326005/99 is one using a matrix calculation for color conversion, and the color conversion characteristic is represented by the coefficients used in the matrix calculation. For instance, when the color conversion device performing the color conversion using the matrix calculation of formula No. 1 in Japanese Patent Application No. 326005/00 is used, the color conversion characteristic is represented by coefficient matrixes Eij (i=1 to 3, j=1 to 3), and Fij (i=1 to 3, j=1 to 18). By altering part or all of the coefficients forming the coefficient matrixes, the conversion characteristic can be altered.

When the color conversion is performed using a look-up table, the color conversion characteristic is represented by the contents of the table (the values stored at the respective memory locations, or addresses). That is, values representing a set of R3, G3, B3 to be output responsive to the input set of R2, G2, B2 are stored at memory locations corresponding to the values of the input set of R2, G2, B2. Accordingly, for the alteration of the color conversion characteristic, the values stored in the table are rewritten.

The color-converted data R3, G3, B3 output from the color conversion means 2 are input to the image display data output means 4. The data R3, G3, B3 input to the image display data output means 4 are subjected to output image processing at the image display data output means 4, and output as image display data R1, G1, B1 to the image display means 5, which displays the image. The output image processing may involve one for tone correction processing suitable for the characteristic of the image display means 5. The image display means 5 may be one comprising a liquid crystal panel, one comprising a CRT, or the like.

Figure 2:
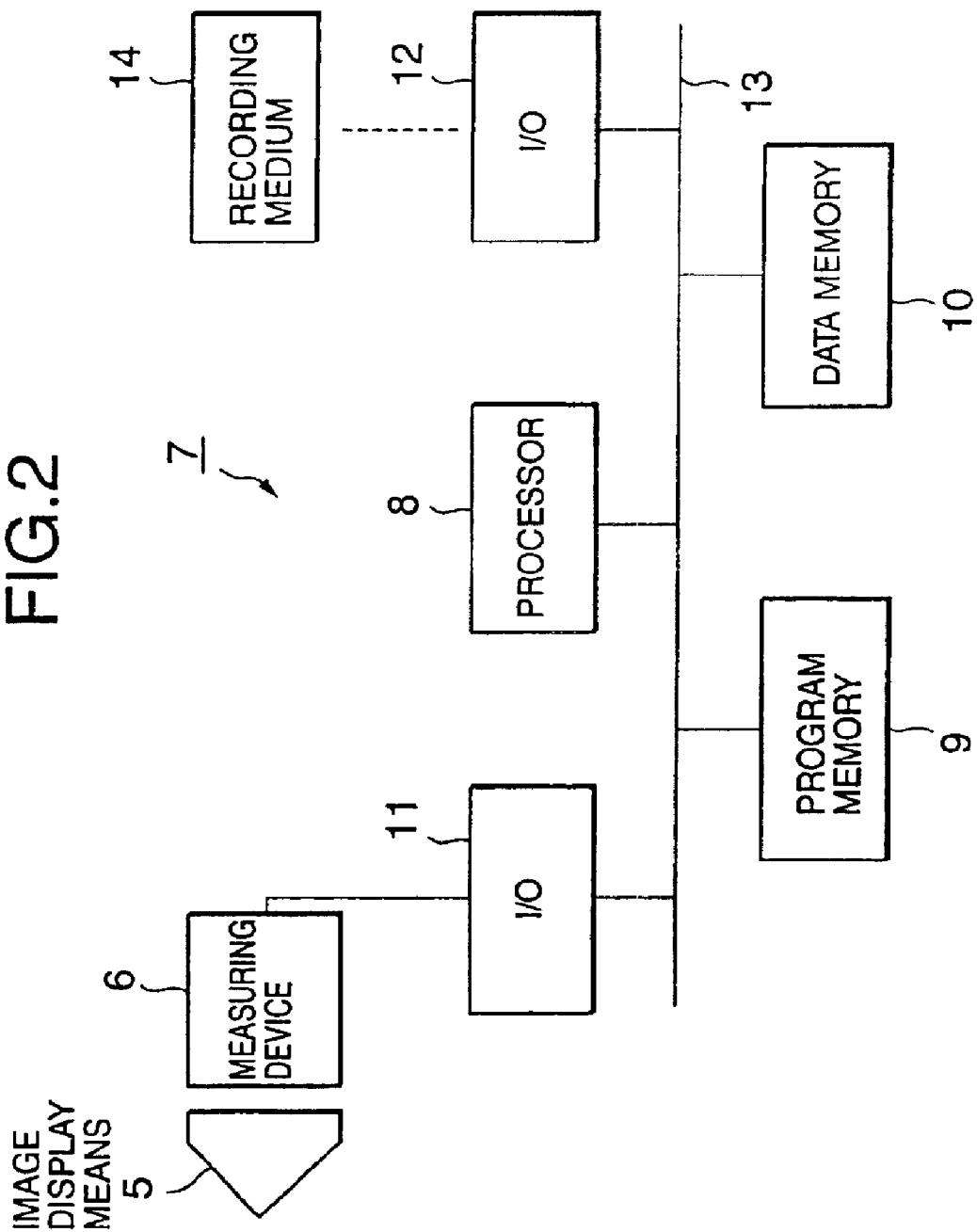
FIG. 2 is a block diagram shown a measurement device and a computer system used for implementing the color conversion characteristic determining method according to Embodiment 1 of the present invention.

FIG. 2 shows a measuring device and a computer system used for implementing the color conversion characteristic determining method according to the present embodiment. The measuring device 6 measures the tristimulus values of the image displayed on the image display means 5. The computer system 7 is used to receive the outputs of the measuring device 6 to measure the characteristic of the image display means 5, and determine the color conversion characteristic.

The computer system 7 comprises a processor 8, a program memory 9, a data memory 10, an I/O interfaces 11 and 12 for input from and output to external devices, and a bus 13 for coupling these members. The program memory 9 stores programs to be executed. The processor 8 operates according to the programs stored in the program memory 9, to perform the processing shown in FIG. 3 and FIG. 4 for implementing the color conversion characteristic determining method. During such operation, the processor 8 writes and read data from the data memory 10. The programs stored in the program memory 9 may be stored in a separate recording medium 14, and may be transferred to the program memory 9 when the processing shown in FIG. 3 or FIG. 4 is executed.

In the present embodiment, the determination of the color conversion characteristic is made by measuring the characteristic of the image display means, and utilizing the results of the measurement to determine the color conversion characteristic. The measurement of the characteristic of the image display means is performed when the image display means used is altered, so that once the characteristic is measured, the results of the measurement can be utilized as long as the same image display means is used. The determination of the color conversion characteristic is performed when design of any part of the image display device is altered, or the target reproduction is altered.

The procedure for measuring the characteristic of the image display means is first described with reference to FIG. 3, and then the determination of the color conversion characteristic utilizing the results of the measurement will be described with reference to FIG. 4.

Figure 3:
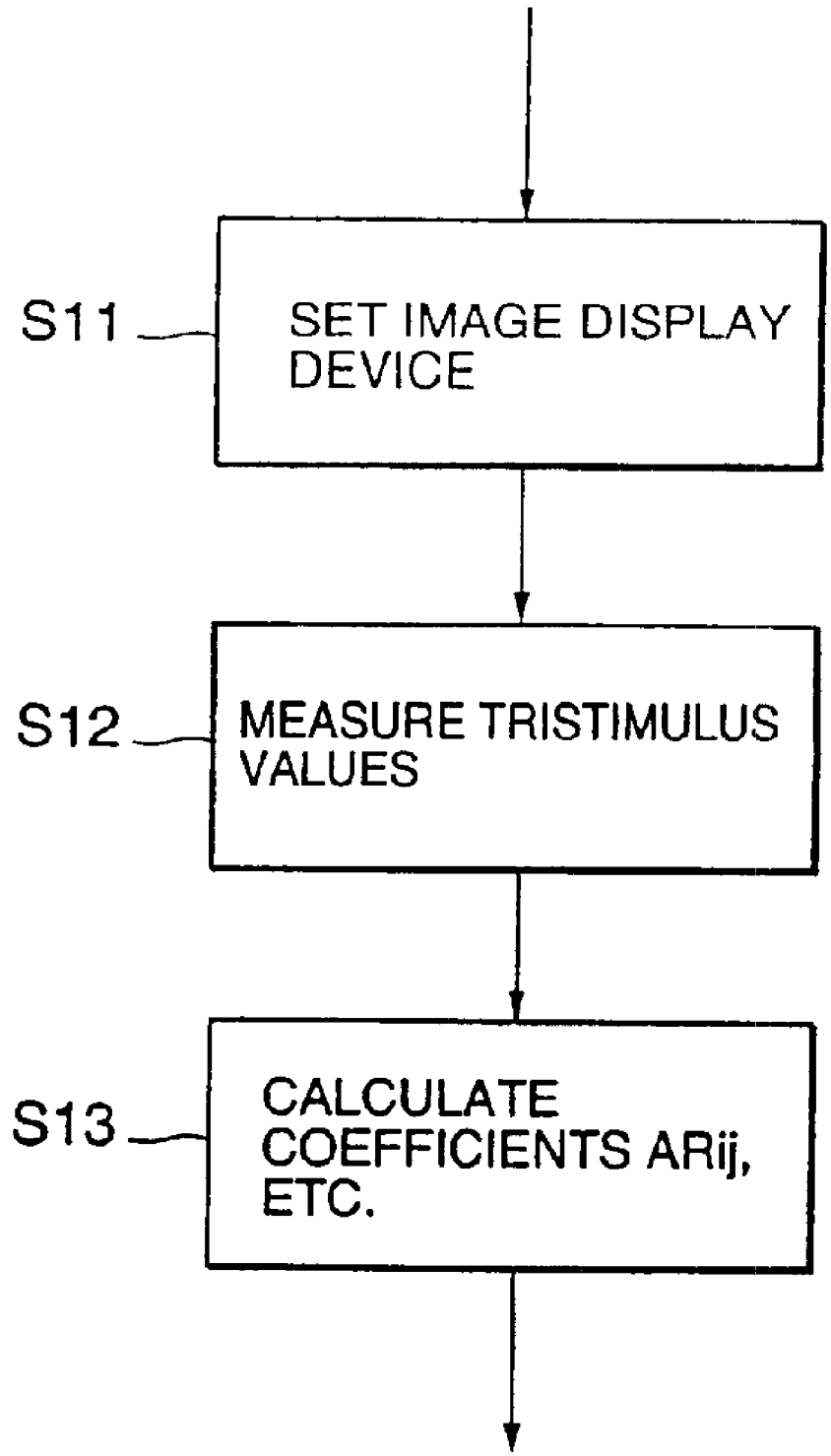
FIG. 3 is a flowchart showing the processing for measuring the characteristic of the image display means according to Embodiment 1 of the present invention.
Figure 4:
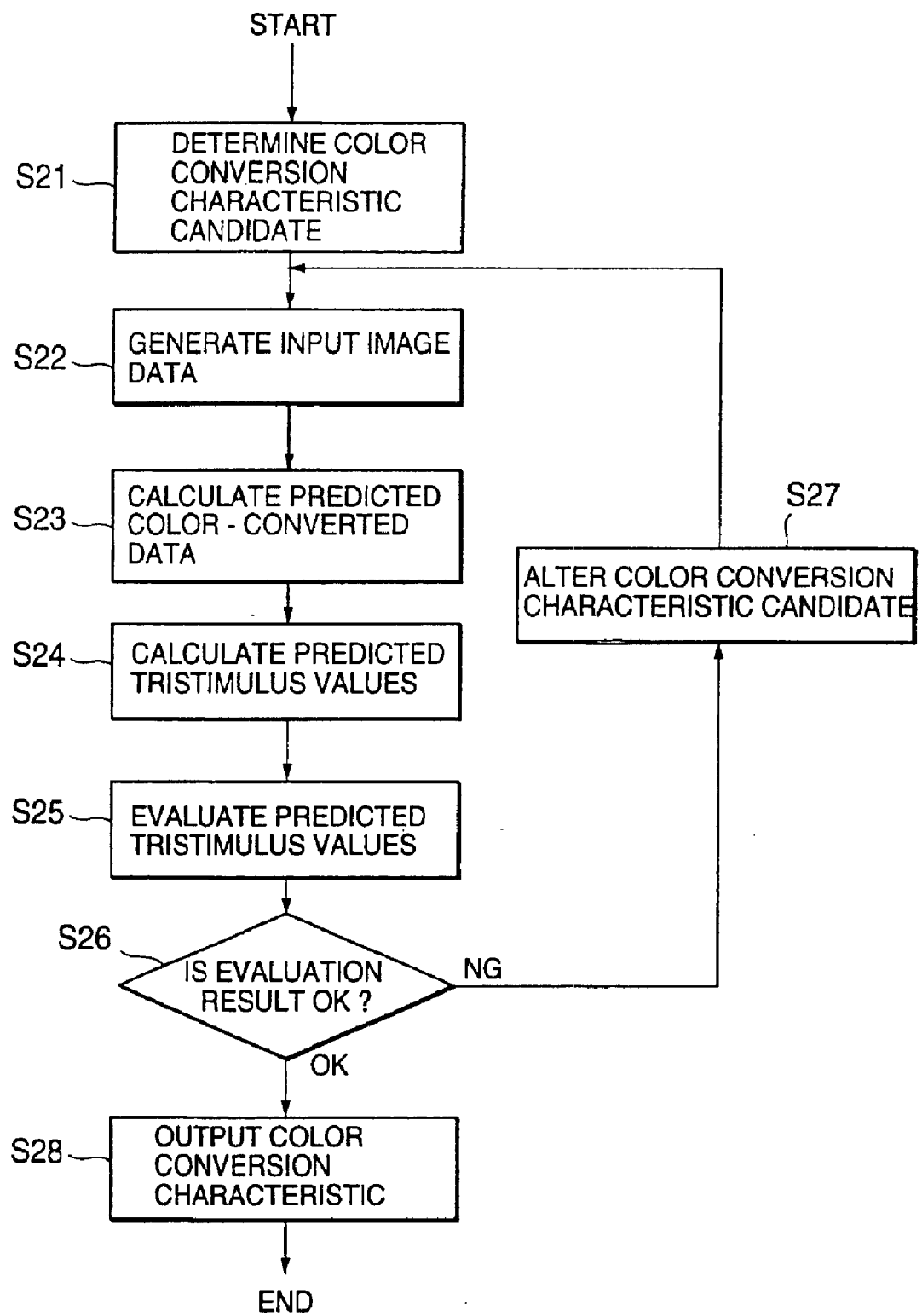
FIG. 4 is a flowchart showing the processing of color conversion characteristic determining method according to Embodiment 1 of the present invention.

FIG. 3 is a flowchart showing the procedure of measuring the characteristic of the image display means according to the present embodiment. As was described above, the process is implemented using the measurement device 6 and the computer system 7 in FIG. 2.

In FIG. 3, a reference mark S11 denotes a step of setting an image display device, S12 denotes a step of measuring tristimulus values, and S13 denotes a step of calculating characteristic coefficients.

First, in step S11, the image display device is so set that the image display data R1, G1, B1 input to the image display means 5 are equal to the input image data R0, G0, B0.

Next, in step S12, tristimulus values of colors displayed on the image display means 5 are measured for a plurality of (e.g., 120) sets of input image data (each image data causes the same color throughout the screen).

Next, in step S13, values of ARij, AGij, ABij, Eik, and Xbk, Ybk, Zbk are determined as a least-squares solution using the sets of the input image data R0, G0, B0 used in the step S11, and the measured data obtained in the step S12. Details of determining the values will be described later.

FIG. 4 is a flowchart showing the process of determining the color conversion characteristic, utilizing the results of the measurement of the characteristic of the image display means. This process is also performed using the computer system 7 in FIG. 2.

In FIG. 4, S21 denotes a step of determining color conversion characteristic candidate, S22 denotes a step of generating input image data, S23 denotes a step of calculating predicted color-converted data, S24 denotes a step of calculating predicted tristimulus values, S25 denotes a step of evaluating the predicted tristimulus values, S26 denotes a step of judgement, S27 denotes a step of altering the color conversion characteristic candidate, and S28 denotes a step of outputting the color conversion characteristic.

In the color conversion characteristic candidate determination step S21, one color conversion characteristic candidate is selected as a candidate of a color conversion characteristic that is to be ultimately adopted. The color conversion characteristic candidate (initial value) used in step S21 may be any arbitrary one, or a standard one, or one that was adopted in the preceding color conversion characteristic determining process.

When the color conversion characteristic candidate is determined in step S21, the next step is the input image data generation step S22. In the input image data generation step S22, predetermined sets of input image data (R0, G0, B0), e.g., 60 sets of input image data are generated. Each of the sets of input image data generated in the step S22 corresponds to the input image data R0, G0, B0 to the image display device shown in FIG. 1, and is an image data used for the evaluation of the color conversion characteristic candidate.

The sets of the input image data that are utilized may be different depending on the color conversion characteristic which is being evaluated. For instance, when the design of the image display device is altered, or when the form of the input image data is altered, the sets of the input image data that are used may be altered. When there is a stipulation with regard to the image data to be used for evaluation for the target color reproduction, the image data specified by the stipulation should be included in the sets of the input image data.

After the sets of input image data (R0, G0, B0) are generated in the input image data generation step S22, the next step is the predicted color-converted data calculation step S23. In the predicted color-converted data calculation step S23, the color conversion characteristic candidate determined in the step S21 is used to calculate, from a plurality of (e.g., 60) sets of input image data (R0, G0, B0) generated in the step S22, a corresponding plurality of sets of predicted color-converted data (R3, G3, B3) which are predicted values of a corresponding plurality of (e.g., 60) sets of color-converted data R3, G3, B3 in the image display device shown in FIG. 1. (The predicted color-converted data are designated by the same reference marks R3, G3, B3, as the color-converted data.) That is, each set of color-converted data (each of a plurality of (e.g., 60) sets of color-converted data) is calculated from a corresponding set of input image data (a corresponding one of plurality of (e.g., 60) sets of input image data.

The predicted color-converted data can be calculated by simulating the operation of the input image data processing means 1 and the color conversion means 2 (which are formed of hardware) in the image display device shown in FIG. 1.

Compared with the operation of hardware, the simulation by means of software takes longer time, but the simulation of the operation of hardware by means of software is easy.

After the sets of predicted color-converted data (R3, G3, B3) are calculated in the step S23, the next step is the predicted tristimulus value calculation step S24. In the step S24, a corresponding plurality of (e.g., 60) sets of predicted tristimulus values (X, Y, Z) which are predicted values of the tristimulus values of colors displayed on the image display means 5 are calculated from the corresponding plurality of (e.g., 60) sets of predicted color-converted data (R3, G3, B3) generated at the step S23, using the characteristic of the image display means 5 shown in FIG. 1. That is, each set of predicted tristimulus values (each of the plurality of (e.g., 60) sets of predicted tristimulus values) is calculated from the corresponding set of color-converted data (a corresponding one of the plurality of (e.g., 60) sets of color-converted data).

Figure 5:
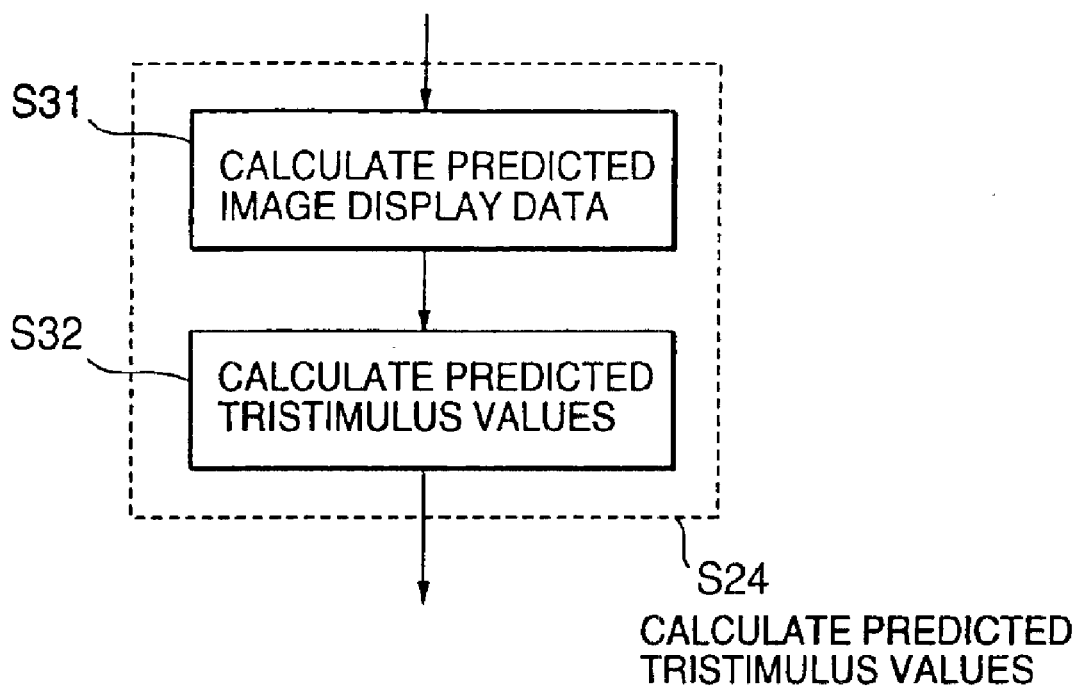
FIG. 5 is a flowchart showing the processing of the step S24 for calculating the predicted tristimulus values in the color conversion characteristic determining method according to Embodiment 1 of the present invention.

FIG. 5 shows details of the processing in the predicted tristimulus value calculation step S24. In the drawing, reference mark S31 denotes a step of calculating predicted image display data, and S32 denotes a step of calculating predicted tristimulus values based on the predicted image display data calculated at the step S31.

In the predicted image display data calculation step S31, a plurality of (e.g., 60) sets of predicted image display data (R1, G1, B1) which are predicted values of image display data R1, G1, B1 of the image display device shown in FIG. 1 are calculated from a plurality of (e.g., 60) of sets of predicted color-converted data (R3, G3, B3), which are calculated in the predicted color-converted data calculation step S23. (The predicted image display data are also denoted by the same reference marks R1, G1, B1, as the image display data.) That is, each set of predicted image data (each of a plurality of (e.g., 60) sets of predicted image display data) is calculated from a corresponding set of color-converted data (a corresponding one of plurality of (e.g., 60) sets of color-converted data).

The predicted image display data can be determined by simulating the operation of the image display data output means 4 in the image display device shown in FIG. 1. For instance, when the image display data output means 4 performs tone correction processing, the same tone correction processing is applied to the predicted color-converted data by means of software, to determine the predicted image display data.

An image display device which is not provided with an image display data output means 4 can be considered to be equivalent to an arrangement in which, in the image display device shown in FIG. 1, the image display data output means 4 outputs the color-converted data R3, G3, B3 without modification, as the image display data R1, G1, B1. In such a case, in the determination of the color conversion characteristic, the set of predicted color-converted data (R3, G3, B3) may be used as the set of predicted image display data (R1, G1, B1) without modification.

When the sets of predicted image display data (R1, G1, B1) are calculated in the predicted image display data calculation step S31, the next step is a step S32. In the step S32, a plurality of (e.g., 60) sets of predicted tristimulus values (X, Y, Z) which are predicted values of tristimulus values of colors displayed on the image display means 5 are calculated from the plurality of (e.g., 60) of sets of predicted image display data (R1, G1, B1), using the characteristic of the image display means 5 of the image display device shown in FIG. 1. That is, each set of predicted tristimulus values (each of a plurality of (e.g., 60) sets of predicted tristimulus values) is calculated from a corresponding set of predicted display image data (a corresponding one of a plurality of (e.g., 60) sets of predicted display image data).

For the calculation of the predicted tristimulus values (X, Y, Z) in the step S32, the following formulae (6), (7), (8), and (9) may be used.

$$\begin{bmatrix} Xr \\ Yr \\ Zr \end{bmatrix} = (ARij) \begin{bmatrix} R1^4 \\ R1^3 \\ R1^2 \\ R1 \\ 1 \end{bmatrix} \quad (6)$$

$$\begin{bmatrix} Xg \\ Yg \\ Zg \end{bmatrix} = (AGij) \begin{bmatrix} G1^4 \\ G1^3 \\ G1^2 \\ G1 \\ 1 \end{bmatrix} \quad (7)$$

$$\begin{bmatrix} Xb \\ Yb \\ Zb \end{bmatrix} = (ABij) \begin{bmatrix} B1^4 \\ B1^3 \\ B1^2 \\ B1 \\ 1 \end{bmatrix} \quad (8)$$

$$\begin{bmatrix} X \\ Y \\ Z \end{bmatrix} = (Eik) \begin{bmatrix} Xr \\ Xg \\ Xb \\ Yr \\ Yg \\ Yb \\ Zr \\ Zg \\ Zb \end{bmatrix} + \begin{bmatrix} Xbk \\ Ybk \\ Zbk \end{bmatrix} \quad (9)$$

In the formulae (6), (7), (8) and (9), ARij, AGij, ABij (i=1 to 3, j=1 to 5) and Eik (i=1 to 3, k=1 to 9) represent coefficients. In the formulae (6), (7), (8) and (9), ARij, AGij, ABij, Eik and Xbk, Ybk, Zbk represent values inherent to the characteristic of the image display means 5 in the image display device shown in FIG. 1. The values of ARij, AGij, ABij, Eik and Xbk, Ybk, Zbk can be determined by, for example, first setting the image display device such that the image display data input to the image display means 5 are equal to the input image data, measuring the tristimulus values of colors displayed on the image display means 5 for the plurality of (e.g., 120) sets of input image data, and finding least-squares solution using the sets of input image data and the measured data obtained by the measurement, as described with reference to FIG. 3.

An example of determining the least-squares solution is described next. Let us suppose a situation where a function f(x) is represented by a linear combination p(x, c0, c1, ... , cn), of a system of (n+1) functions g0(x), g1(x), . . . , gn(x) given by the following formula (10).

$$p(x, c0, c1, \ldots, cn) = c0 \times g0(x) + c1 \times g1(x) + \ldots + cn \times gn(x) \quad (10)$$

In the formula (1), c0, c1, . . . ,cn represent coefficients. When the function values are given for (m+1) discrete values x0, x 1, . . . , x m, in the system of functions g0(x), g1(x), . . . , gn(x), the least-squares solution of c0, c1, . . . , cn can be obtained by solving the following simultaneous equations (11).

$$\begin{bmatrix} \sum_{k=0}^{m} \{g0(x_k)\}^2 & \sum_{k=0}^{m} g0(x_k) \times g1(x_k) & \cdots & \sum_{k=0}^{m} g0(x_k) \times gn(x_k) \\ \sum_{k=0}^{m} g1(x_k) \times g0(x_k) & \sum_{k=0}^{m} \{g1(x_k)\}^2 & \cdots & \sum_{k=0}^{m} g1(x_k) \times gn(x_k) \\ \cdots & \cdots & \cdots & \cdots \\ \sum_{k=0}^{m} gn(x_k) \times g0(x_k) & \sum_{k=0}^{m} gn(x_k) \times g1(x_k) & \cdots & \sum_{k=0}^{m} \{gn(x_k)\}^2 \end{bmatrix} \quad (11)$$

$$\begin{bmatrix} c0 \\ c1 \\ \vdots \\ cn \end{bmatrix} = \begin{bmatrix} \sum_{k=0}^{m} g0(x_k) \times f(x_k) \\ \sum_{k=0}^{m} g1(x_k) \times f(x_k) \\ \cdots \\ \sum_{k=0}^{m} gn(x_k) \times f(x_k) \end{bmatrix}$$

For instance, Arij in the above-mentioned formula (6) can be determined by setting:

n=4,

Xmr, Ymr or Zmr=f(x)

g0 (x)=R14, g1 (x)=R13, g2 (x)=R12, g3 (x)=R1, and g4 (x)=1.

Here, Xmr, Ymr, and Zmr are measured values obtained when the input image data R0, G0, B0 are given by:

R0=R,

G0=0, and

B0=0, and the image display data R1, G1, B1 will then be given by:

R1=R,

G1=0, and

B1=0.

Xr, Yr, Zr obtained by the formula (6) are predicted values of tristimulus values, according to the XYZ color system, of the colors displayed on the image display means 5, responsive to R1 which is a red component of the predicted image display data. Xg, Yg, Zg obtained by the formula (7) are predicted values of tristimulus values, according to the XYZ color system, of the colors displayed on the image display means 5, responsive to G1 which is a green component of the predicted image display data. Xb, Yb, Zb obtained by the formula (8) are predicted values of tristimulus values, according to the XYZ color system, of the colors displayed on the image display means 5, responsive to B1 which is a blue component of the predicted image display data. X, Y, Z obtained by the formula (9) are predicted tristimulus values which are predicted values of the tristimulus values, according to the XYZ color system, of the colors displayed on the image display means 5, responsive to the predicted image display data.

An advantage obtained by determining the predicted tristimulus values in accordance with the formulae (6), (7) (8) and (9) will be explained next.

An alternative method of determining the predicted tristimulus values from the predicted image display data is one using the following formulae (12) and (13).

$$R10 = 255*(R1/255)^\gamma$$
$$G10 = 255*(G1/255)^\gamma$$
$$B10 = 255*(B1/255)^\gamma \qquad (12)$$

$$\begin{bmatrix} X \\ Y \\ Z \end{bmatrix} = \begin{bmatrix} Xr1 & Xg1 & Xb1 \\ Yr1 & Yg1 & Yb1 \\ Zr1 & Zg1 & Zb1 \end{bmatrix} \begin{bmatrix} R10 \\ G10 \\ B10 \end{bmatrix} + \begin{bmatrix} Xbk1 \\ Ybk1 \\ Zbk1 \end{bmatrix} \qquad (13)$$

Here, γ denotes a value representing a tone characteristic of the image display means. Xbk1, Ybk1, Zbk1 denote tristimulus values displayed on the image display means 5 when black is displayed (i.e., when (R1, G1, B1)=(0, 0, 0)). Xr1, Yr1, Zr1 denote values obtained by subtracting Xbk1, Ybk1, Zbk1 from the tristimuls values displayed on the image display means 5 when red is displayed (i.e., when (R1, G1, B1)=(255, 0, 0)). Xg1, Yg1, Zg1 denote values obtained by subtracting Xbk1, Ybk1, Zbk1 from the tristimuls values displayed on the image display means 5 when green is displayed (i.e., when (R1, G1, B1)=(0, 255, 0)). Xb1, Yb1, Zb1 denote values obtained by subtracting Xbk1, Ybk1, Zbk1 from the tristimuls values displayed on the image display means 5 when blue is displayed (i.e., when (R1, G1, B1)=(0, 0, 255)). The values of Xr1, Yr1, Zr1, Xg1, Yg1, Zg1, Xb1, Yb1, Zb1, and Xbk1, Ybk1, Zbk1 can be obtained by, for example, setting the image display device such that the image display data input to the image display means 5 are equal to the input image data, and measuring the tristimulus values of colors displayed on the image display means 5 for the respective sets of input image data.

In the formulae (12), and (13), the image display data are assumed to be an integer of 8 bits, i.e., an integer of from 0 to 255. The formulae (12), and (13) are based on an assumption that the image display mean 5 satisfies the following two conditions. First, the law of an ideal additive mixing of colors holds. That is, the Grassmann's law holds. Secondly, the image display means 5 has the tone characteristic expressed by the following formula (14).

$$y = x^\gamma \qquad (14)$$

Figure 6:
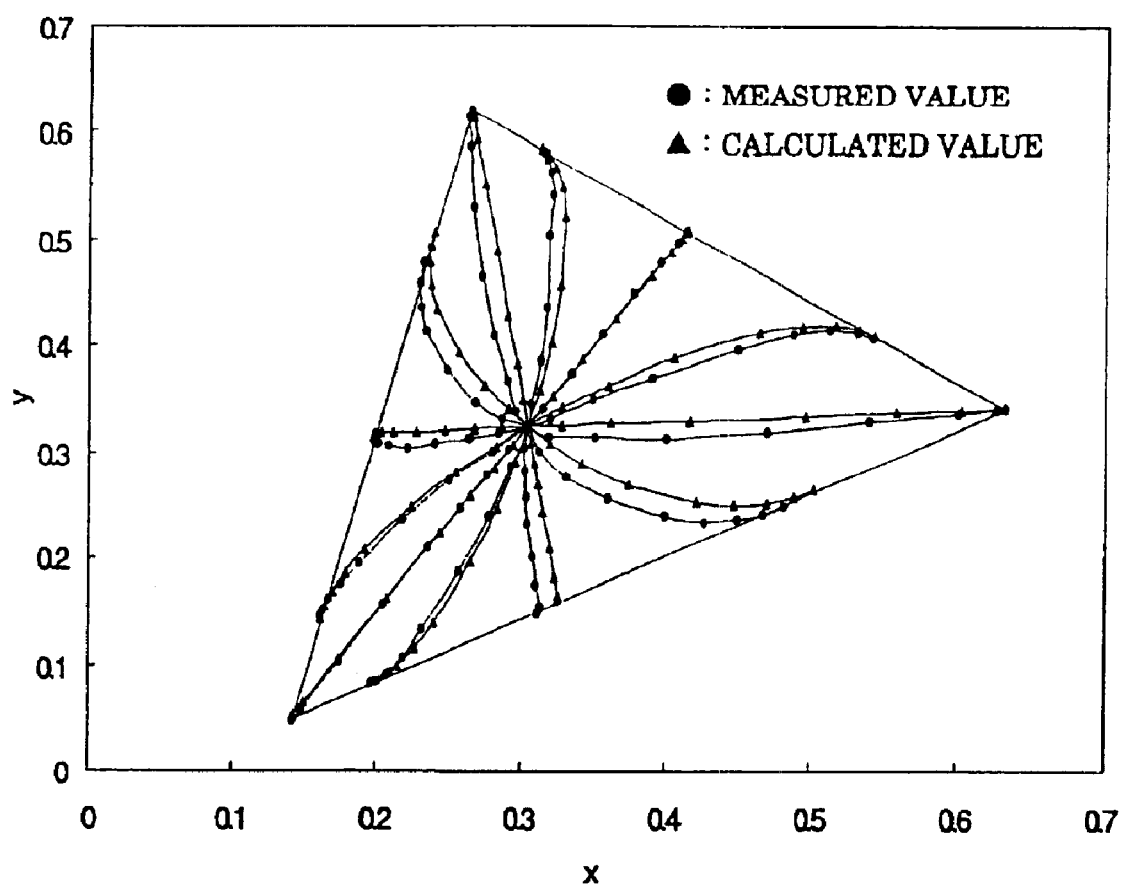
FIG. 6 is an XY chromaticity diagram showing the predicted tristimulus values and the measured values.

FIG. 6 shows an xy chromaticity diagram showing a comparison, with the measured values, of the results of calculation of the predicted tristimulus values of displayed colors in accordance with the formulae (12) and (13), using a certain liquid crystal display device. It will be seen that there are considerable differences between the predicted tristimulus values and the measured values. The color difference obtained by the color difference formula, according to the CIE1976 L*a*b* color system, between the predicted tristimulus values according to the formulae (12) and (13), and the measured values were 4.01 on average, and 10.98 at the maximum. The predicted tristimulus values and the measured values, and their color differences were obtained for the 159 colors shown in FIG. 7.

In contrast, the color differences by the color difference formula, according to the CIE1976 L*a*b* color system, between the predicted tristimulus values determined according to the formulae (6), (7), (8), and (9) and the measured values were 2.02 on average, and 15.50 at the maximum. The predicted tristimulus values and the measured values, and the color differences were also obtained for the 159 colors shown in FIG. 7. By determining the predicted tristimulus values of the displayed colors according to the formulae (6), (7), (8), and (9), the average of the color differences from the measured values can be reduced. In other words, the accuracy of calculation of the predicted tristimulus values can be improved.

For determining the color conversion characteristic by which the color reproduction of the image display device is made to approach (be closer to) the target color reproduction of sRGB or the like, it is necessary to minimize the color difference between the colors displayed on the image display device as a result of using the calculated color conversion characteristic, and the target color reproduction. Where the color conversion characteristic for a plurality of image display devices manufactured under the same design standard may be determined either by determining a color conversion characteristic for each image display device, or by determining a color conversion characteristic for a typical image display device that has been chosen from among a plurality of image display devices. The image display devices manufactured under the same design standard may have differences in the color reproduction characteristic, due for example to differences in the characteristic of the image display means. Accordingly, the color reproduction of a higher accuracy can be obtained if the color conversion characteristic is determined for each image display device. However, this means that the determination of the color reproduction characteristic needs to be repeated for the number of image display devices manufactured, and an enormous amount of time will be required. For this reason, a usual practice is to select a typical image display device from among a plurality of image display devices of the same design standard, and determine the color conversion characteristic for this selected image display device. In this case, the accuracy with which the color conversion characteristic for the typical image display device is determined should be as high as possible, to allow for the degradation of the accuracy in the color conversion characteristics of the image display devices other than the typical image display device, due to the differences in the color conversion characteristic. In this case, the color difference for the typical image display device is made to be not more than 3 (at the worst), with the target value being about 1, in a state in which the color conversion characteristic has just been determined. When the average of the differences between the predicted tristimulus values and the measured values is 3 or more, it is extremely difficult to make less than 3 the color difference for the measured values of the individual image devices.

There are two factors which degrade the accuracy of calculation of the predicted tristimulus values according to the formulae (12) and (13). The first factor is that the tone characteristic of the image display means is not necessarily represented by the formula (14). The second factor is that the image display means does not necessarily satisfy the law of ideal additive mixture. For instance, it has been confirmed by measurement that, in some TN (twisted-nematic) liquid crystals used in a liquid crystal display devices, the spectral transmittance characteristic of the liquid crystal varies with the variation in the input signal (i.e., the variation in the applied voltage). The variation in the spectral transmittance characteristic of the liquid crystal directly affects the ratio between the tristimulus values of colors displayed on the liquid crystal display, and in such a case, the law of ideal additive mixture does not hold. The variation of the spectral transmittance of the liquid crystal against the variation in the applied voltage is due to the fact that the actual TN liquid crystal is associated not only optical rotary, but is also associated with a certain degree of double refraction. Moreover, when a crosstalk is present between color channels in an image image display means, the law of ideal additive mixture does not hold. For instance, in a liquid crystal display device, when red is displayed, no light should transmit in the green and blue cells. Where some light transmit in the green and blue cells, the law of ideal additive mixture does not hold.

After the plurality of (e.g., 60) sets of predicted tristimulus values are calculated in the step S24 in FIG. 4, the next step is the predicted tristimulus value evaluation step S25. In the step S25, the predicted tristimulus values are evaluated using the tristimuls values in the target color reproduction as a reference, and the color conversion characteristic used for the calculation of the predicted tristimulus values are thereby evaluated.

Figure 8:
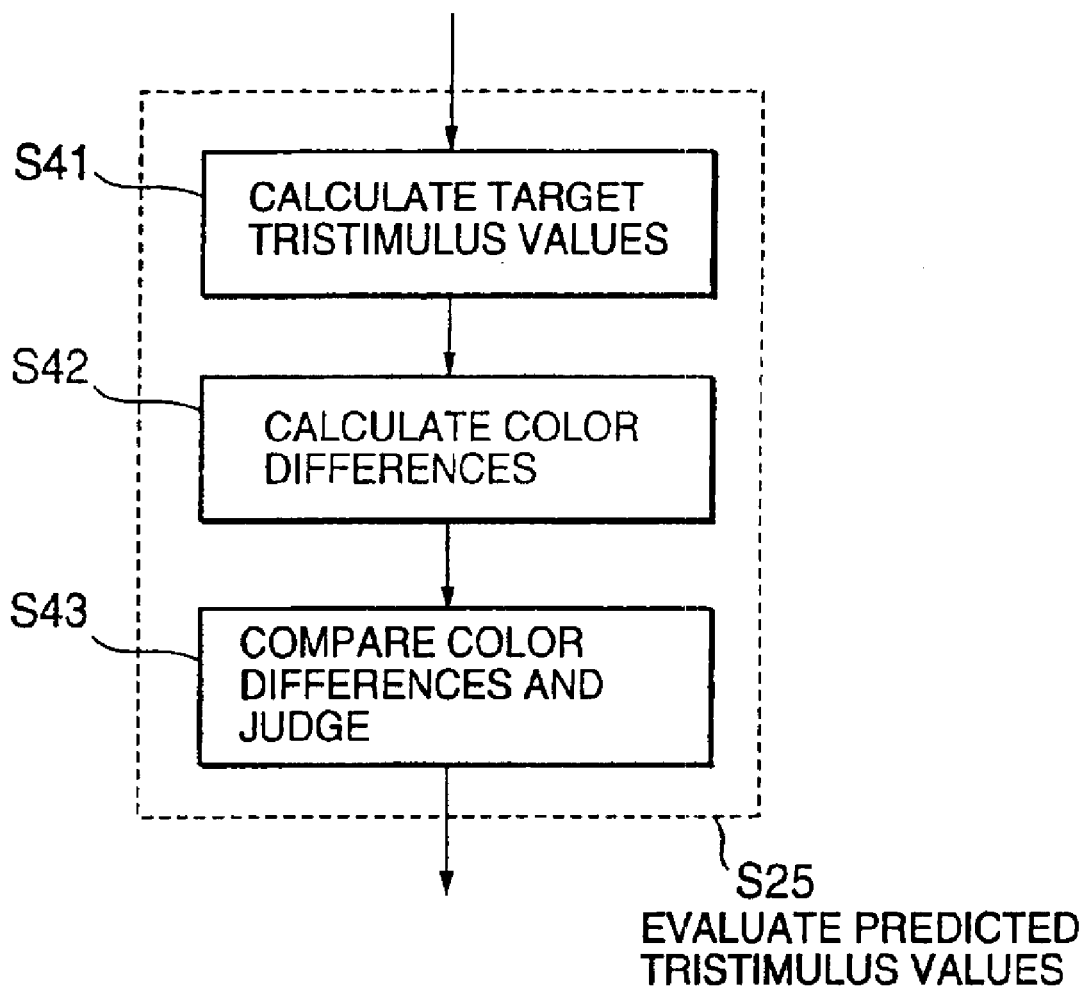
FIG. 8 is a flowchart showing the processing of the step S25 for evaluating the predicted tristimulus values in the color conversion characteristic determining method according to Embodiment 1 of the present invention.

FIG. 8 shows details of the processing in the predicted tristimulus value evaluation step S25. In FIG. 8, reference mark S41 denotes a target tristimulus value calculation step, S42 denotes a color difference calculation step, and S43 denotes a color difference comparison/judgement step.

First, in the step S41, a plurality of (e.g., 60) sets of target tristimulus values, which are the tristimulus values in the target color reproduction are calculated from the plurality of (e.g., 60) sets of input image data (R0, G0, B0) generated in the input image data generation step S22. The target tristimulus values can be calculated according to the definition of the target color reproduction. For instance, when the target color reproduction is a sRGB color space defined by IEC 61966-2-1, the target tristimuls values can be calculated according to the procedure prescribed for calculation of the tristimulus values of colors to be displayed responsive to the input image data.

The IEC61966-2-1 provides a formula for determining the tone-converted data obtained by tone-conversion from the input image data according to the prescribed tone characteristic, and a formula for determining the tristimulus values from the tone-converted data. Through calculation according these formulae, the target tristimulus values can be calculated.

After the sets of target tristimulus values are calculated in the step S41, the next step is the color difference calculation step S42. In the step S42, the group of color differences between the sets of predicted tristimulus values, and the sets of target tristimulus values are calculated.

The color differences between the predicted tristimulus values and the target tristimulus values can be determined for example according to the color difference formula based on the CIE1976 L*a*b* color system. The CIE1976 L*a*b* color system is one of the color systems recommended by the CIE (Commission Internationale de l'Éclairage) in 1976, and is a uniform color space in which a distance between two colors in the coordinate is made to correspond to the perceptual color difference at any part. The color difference formula based on the CIE1976 L*a*b* color system is generally used for calculation of the color difference.

The color differences between the predicted tristimulus values and the target tristimulus values can also be determined according to the CIE1994 color difference formula. The CIE1994 color difference formula were obtained by modifying the color difference formula based on the CIE1976 L*a*b* color system so that the magnitudes of the color differences determined coincide more closely with the perceptual color differences.

After the group of color differences between the sets of the predicted tristimulus values and the sets of the target tristimulus values are calculated in the step S42, the next step is the color difference comparison/judgement step S43. In the step S43, the group of the color differences between the sets of the predicted tristimulus values and the sets of the target tristimulus value calculated in the step S42 are compared with a predetermined reference value. In the comparison of the group of the color differences with the reference value, the maximum value of the color differences may be compared with a reference value, or an average value of the color differences may be compared with a reference value. In the step S42, the color differences are evaluated based on the results of comparison of the group of the color difference with the reference value, and the result of the evaluation is output. The result of the evaluation may be "OK" (indicating that the result is satisfactory) if the maximum value or the average value of the group of the color differences is smaller than reference value, and may otherwise be "NG" (indicating that the result is not satisfactory).

After the result of evaluation is output at the step S43, the next step is the judgement step S26. When the result of the evaluation indicates "OK," the next step is the color conversion characteristic output step S28. When the result of the evaluation indicates "NG," the next step is the new color conversion characteristic candidate determination step S27. In the step S28, the current color conversion characteristic candidate is adopted and output as the color conversion characteristic which satisfies the requirement, and the determination of the color conversion characteristic is terminated. The thus-determined color conversion characteristic is stored and held in the color conversion characteristic holding means 3, and utilized during the operation of the image display device, as described above.

In the new color conversion characteristic candidate determination step S27, a new color conversion characteristic candidate is determined, and the next step is again the input image data generation step S22. In one method for determining the new color conversion characteristic candidate, the current color conversion characteristic candidate (the color conversion characteristic candidate used in the immediately preceding step S23, i.e., color conversion characteristic candidate used in the immediately preceding processing) is modified by varying only one component for one color. For instance, if the color conversion characteristic comprises the color conversion characteristic for red, the color conversion characteristic for green, and the color conversion characteristic for blue, only one component of the color conversion characteristic for red, for example may be varied from the current color conversion characteristic candidate to generate a new color conversion characteristic candidate.

The selection or determination of the color conversion characteristic candidate in the step S27 may be implemented by selecting, in a prescribed order, a plurality of color conversion characteristic candidates which are provided in advance. The selection or determination may also be implemented by relying on the experience of the operator. Still alternatively, a method may be adopted in which, if the color difference is increased responsive to a variation (e.g., increase) of one component, then the same component is varied in the reverse direction (e.g., decreased) in the next step.

If the result of evaluation is "NG" for all the color conversion characteristic candidates, then the color conversion characteristic candidate exhibiting the smallest color difference, from among all the color conversion characteristic candidates may be adopted as the color conversion characteristic.

The color conversion characteristic determining method according to the present embodiment performs the determination of the color conversion characteristic in the manner described above. Since the color conversion characteristic is determined by determining and evaluating the predicted tristimulus values for sets of the input image data and color conversion characteristic candidates, it is not necessary to measure the tristimulus values of colors displayed on the image display means each time the color conversion characteristic candidate is varied, and the tristimulus values of colors displayed on the image display means need to be measured only when the characteristic of the image display means is determined. For this reason, the time required for the determination of the color conversion characteristic can be substantially reduced.

The measurement of the tristimuls values of colors displayed on the image display means generally takes several seconds for each color, or more than one minutes (for each color) in the case of a high-precision measurement. For instance, if the method of FIG. 11 is adopted, and setting of the color conversion characteristic candidate and measurement for the purpose of confirmation of 60 sets of input image data for 60 kinds (60 colors) are repeated, and if it takes 10 seconds for each color, 10 minutes will be required for each color conversion characteristic candidate because the tristimulus values of colors displayed for each color conversion characteristic candidate are respectively measured. If the determination of the color conversion characteristic candidate is repeated 50 times, the total time required for the determination of the color conversion characteristic (measurements for the determination) will be 500 minutes.

In contrast, according to the color conversion characteristic determining method of this embodiment, the tristimulus values of colors displayed on the image display means need to be measured only at the time of determining the characteristic of the image display means. If tristimulus values of 120 colors are measured at the time of determining the characteristic of the image display means, the total time required for the measurement will be 20 minutes.

If the calculation of the predicted tristimulus values, the calculation of the color difference, and the like are implemented by a computer, the time required for each color conversion characteristic candidate is at most several seconds. If this is assumed to be five seconds, the time required for repeating it 50 times is 250 seconds, or 4.167 minutes. The sum of this time length and the time (20 minutes) for the measurement of the characteristic of the image display means is 24.167 minutes, which is substantially shorter than 500 minutes, required by the method of FIG. 11.

If a desired result were obtained by just a small number of cycles or repetitions (in an extreme case, just one cycle) of setting of the color conversion characteristic candidate, and measurement for the purpose of confirmation, then the total time would be shorter with the method of FIG. 11 (If the desired result were obtained by just one cycle, the total time required would be 10 minutes). However, in general, it is necessary to repeat the cycles of setting the color conversion characteristic candidate, and confirmation, more than 30 times.

The difference in the time required for the determination of the color conversion characteristic is greater when the measurement is performed at a higher accuracy, or it is necessary to measure the tristimulus values of colors displayed for a greater amount of image data, or when the number of repetitions (or cycles) of the determination of the color conversion characteristic candidate is increased.

Moreover, in the color conversion characteristic determining method of the present embodiment, the color conversion characteristic is determined by comparing the predicted tristimulus values and the tristimulus value in the target color reproduction, it is possible to determine the color conversion characteristic realizing a color reproduction close to the ideal color reproduction according to the sRGB or NTSC standard. As a result, even if the operator does not have a clear idea of the image in the target color reproduction, it is possible to determine the color conversion characteristic.

Moreover, an image display device using the color conversion characteristic determined by the color conversion characteristic determining method of the present embodiment requires a less cost relating to the determination of the color conversion characteristic because the time required is shorter. Furthermore, since the color conversion characteristic calculated at a high accuracy are used, a color reproduction which is very close to the target color reproduction can be obtained.

Embodiment 2.

In Embodiment 1, the formula (6) was used to calculate the predicted values Xr, Yr, and Zr of the tristimulus values, according to the XYZ color system, of the colors displayed on the image display means, responsive to the red component R1 of the predicted image display data; the formula (7) was used to calculate the predicted values Xg, Yg, and Zg of the tristimulus values, according to the XYZ color system, of the colors displayed on the image display means, responsive to the green component G1 of the predicted image display data; and the formula (8) was used to calculate the predicted values Xb, Yb, and Zb of the tristimulus values, according to the XYZ color system, of the colors displayed on the image display means, responsive to the blue component B1 of the predicted image display data. However, it is possible to determine the predicted monochromatic tristimulus values Xr, Yr, Zr, Xg, Yg, Zg, Xb, Yb and Zb by other formulae.

The following formulae (15), (16), and (17) are for determining the predicted monochromatic tristimulus values Xr, Yr, Zr, Xg, Yg, Zg, Xb, Yb, and Zb in Embodiment 2 of the present invention. In the formulae (15), (16), and (17), ARij, AGij, ABij (i=1 to 3, j=1 to 7) represent coefficients. The predicted tristimulus values is calculated from the predicted monochromatic tristimulus values by the formulae (9), as in Embodiment 1. The processings other than the determination of the predicted monochromatic tristimulus values are identical to those in Embodiment 1.

$$\begin{bmatrix} Xr \\ Yr \\ Zr \end{bmatrix} = (ARij) \begin{bmatrix} R1^6 \\ R1^5 \\ R1^4 \\ R1^3 \\ R1^2 \\ R1 \\ 1 \end{bmatrix} \quad (15)$$

$$\begin{bmatrix} Xg \\ Yg \\ Zg \end{bmatrix} = (AGij) \begin{bmatrix} G1^6 \\ G1^5 \\ G1^4 \\ G1^3 \\ G1^2 \\ G1 \\ 1 \end{bmatrix} \quad (16)$$

$$\begin{bmatrix} Xb \\ Yb \\ Zb \end{bmatrix} = (ABij) \begin{bmatrix} Bl^6 \\ Bl^5 \\ Bl^4 \\ Bl^3 \\ Bl^2 \\ Bl \\ 1 \end{bmatrix} \quad (17)$$

Where the formulae (15), (16), and (17) were used to calculate the predicted monochromatic tristimulus values, and the formula (9) was used to calculate the predicted tristimulus values from the predicted monochromatic tristimulus values, for a certain liquid crystal display device, the average value of the color differences between the predicted tristimulus values and the measured values, according to the color difference formula based on the CIE1976 L*a*b* color system was 1.24, and the maximum value thereof was 5.05. The color difference was determined for 159 colors shown in FIG. 7, as it was for the Embodiment 1.

When the color conversion characteristic determining method according to Embodiment 1 was applied to the same liquid crystal display device, and the formulae (6), (7), and (8) were used to calculate the predicted monochromatic tristimulus values, and the formula (9) was used to calculate the predicted tristimulus values from the predicted monochromatic tristimulus values, the average value of the color differences between the predicted tristimulus values and the measured values determined according to the color difference formula based on the CIE1976 L*a*b* color system was 2.02, and its maximum was 15.50.

As has been described, by using the formulae (15), (16), and (17) to calculate the predicted monochromatic tristimulus values Xr, Yr, Zr, Xg, Yg, Zg, Xb, Yb, and Zb, the average value and the maximum value of the color differences between the predicted tristimulus values and the measured values can be reduced further. In other words, the accuracy of determining the predicted tristimulus values can be improved.

Embodiment 3.

In Embodiment 2, the formula (15) was used to calculate the predicted values Xr, Yr, and Zr of the tristimulus values, according to the XYZ color system, of the colors displayed on the image display means, responsive to the red component R1 of the predicted image display data; the formula (16) was used to calculate the predicted values Xg, Yg, and Zg of the tristimulus values, according to the XYZ color system, of the colors displayed on the image display means, responsive to the green component G1 of the predicted image display data; and the formula (17). was used to calculate the predicted values Xb, Yb, and Zb of the tristimulus values, according to the XYZ color system, of the colors displayed on the image display means, responsive to the blue component B1 of the predicted image display data. However, it is possible to determine the predicted monochromatic tristimulus values Xr, Yr, Zr, Xg, Yg, Zg, Xb, Yb and Zb by other formulae.

The following formulae (18), (19), and (20) are for determining the predicted monochromatic tristimulus values Xr, Yr, Zr, Xg, Yg, Zg, Xb, Yb, and Zb in Embodiment 3 of the present invention. In the formulae (18), (19), and (20), ARij, AGij, ABij (i=1 to 3, j=1 to 9) represent coefficients. The predicted tristimulus values is calculated from the predicted monochromatic tristimulus values by the formulae (9), as in Embodiment 2. The processings other than the determination of the predicted monochromatic tristimulus values are identical to those in Embodiment 2.

$$\begin{bmatrix} Xr \\ Yr \\ Zr \end{bmatrix} = (ARij) \begin{bmatrix} Rl^8 \\ Rl^7 \\ Rl^6 \\ Rl^5 \\ Rl^4 \\ Rl^3 \\ Rl^2 \\ Rl \\ 1 \end{bmatrix} \quad (18)$$

$$\begin{bmatrix} Xg \\ Yg \\ Zg \end{bmatrix} = (AGij) \begin{bmatrix} Gl^8 \\ Gl^7 \\ Gl^6 \\ Gl^5 \\ Gl^4 \\ Gl^3 \\ Gl^2 \\ Gl \\ 1 \end{bmatrix} \quad (19)$$

$$\begin{bmatrix} Xb \\ Yb \\ Zb \end{bmatrix} = (ABij) \begin{bmatrix} Bl^8 \\ Bl^7 \\ Bl^6 \\ Bl^5 \\ Bl^4 \\ Bl^3 \\ Bl^2 \\ Bl \\ 1 \end{bmatrix} \quad (20)$$

Where the formulae (18), (19), and (20) were used to calculate the predicted monochromatic tristimulus values, and the formula (9) was used to calculate the predicted tristimulus values from the predicted monochromatic tristimulus values, for a certain liquid crystal display device, the average value of the color differences between the predicted tristimulus values and the measured values, according to the color difference formula based on the CIE1976 L*a*b* color system was 1.12, and the maximum value thereof was 4.54. The color difference was determined for 159 colors shown in FIG. 7, as it was for the Embodiment 2.

When the color conversion characteristic determining method according to Embodiment 2 was applied to the same liquid crystal display device, and the formulae (15), (16), and (17) were used to calculate the predicted monochromatic tristimulus values, and the formula (9) was used to calculate the predicted tristimulus values from the predicted monochromatic tristimulus values, the average value of the color differences between the predicted tristimulus values and the measured values determined according to the color difference formula based on the CIE1976 L*a*b* color system was 1.24, and its maximum was 5.05.

As has been described, by using the formulae (18), (19) and (20) to calculate the predicted monochromatic tristimulus values Xr, Yr, Zr, Xg, Yg, Zg, Xb, Yb, and Zb, the average value and the maximum value of the color differ ences between the predicted tristimulus values and the measured values can be reduced further. In other words, the accuracy of determining the predicted tristimulus values can be improved.

Embodiment 4.

In Embodiment 3, the formula (18) was used to calculate the predicted values Xr, Yr, and Zr of the tristimulus values, according to the XYZ color system, of the colors displayed on the image display means, responsive to the red component R1 of the predicted image display data; the formula (19) was used to calculate the predicted values Xg, Yg, and Zg of the tristimulus values, according to the XYZ color system, of the colors displayed on the image display means, responsive to the green component G1 of the predicted image display data; and the formula (20) was used to calculate the predicted values Xb, Yb, and Zb of the tristimulus values, according to the XYZ color system, of the colors displayed on the image display means, responsive to the blue component B1 of the predicted image display data. However, it is possible to determine the predicted monochromatic tristimulus values Xr, Yr, Zr, Xg, Yg, Zg, Xb, Yb and Zb by other formulae.

The following formulae (21), (22), and (23) are for determining the predicted monochromatic tristimulus values Xr, Yr, Zr, Xg, Yg, Zg, Xb, Yb, and Zb in Embodiment 4 of the present invention. In the formulae (21), (22), and (23), ARij, AGij, ABij (i=1 to 3, j=1 to 11) represent coefficients. The predicted tristimulus values is calculated from the predicted monochromatic tristimulus values by the formulae (9), as in Embodiment 3. The processings other than the determination of the predicted monochromatic tristimulus values are identical to those in Embodiment 3.

$$\begin{bmatrix} Xr \\ Yr \\ Zr \end{bmatrix} = (ARij) \begin{bmatrix} R1^{10} \\ R1^9 \\ R1^8 \\ R1^7 \\ R1^6 \\ R1^5 \\ R1^4 \\ R1^3 \\ R1^2 \\ R1 \\ 1 \end{bmatrix} \quad (21)$$

$$\begin{bmatrix} Xg \\ Yg \\ Zg \end{bmatrix} = (AGij) \begin{bmatrix} G1^{10} \\ G1^9 \\ G1^8 \\ G1^7 \\ G1^6 \\ G1^5 \\ G1^4 \\ G1^3 \\ G1^2 \\ G1 \\ 1 \end{bmatrix} \quad (22)$$

$$\begin{bmatrix} Xb \\ Yb \\ Zb \end{bmatrix} = (ABij) \begin{bmatrix} B1^{10} \\ B1^9 \\ B1^8 \\ B1^7 \\ B1^6 \\ B1^5 \\ B1^4 \\ B1^3 \\ B1^2 \\ B1 \\ 1 \end{bmatrix} \quad (23)$$

Where the formulae (21), (22), and (23) were used to calculate the predicted monochromatic tristimulus values, and the formula (9) was used to calculate the predicted tristimulus values from the predicted monochromatic tristimulus values, for a certain liquid crystal display device, the average value of the color differences between the predicted tristimulus values and the measured values, according to the color difference formula based on the CIE1976 L*a*b* color system was 1.13, and the maximum value thereof was 4.17. The color difference was determined for 159 colors shown in FIG. 7, as it was for the Embodiment 3.

When the color conversion characteristic determining method according to Embodiment 3 was applied to the same liquid crystal display device, and the formulae (18), (19), and (20) were used to calculate the predicted monochromatic tristimulus values, and the formula (9) was used to calculate the predicted tristimulus values from the predicted monochromatic tristimulus values, the average value of the color differences between the predicted tristimulus values and the measured values determined according to the color difference formula based on the CIE1976 L*a*b* color system was 1.12, and its maximum was 4.54.

As has been described, by using the formulae (21), (22), and (23) to calculate the predicted monochromatic tristimulus values Xr, Yr, Zr, Xg, Yg, Zg, Xb, Yb, and Zb, the maximum value of the color differences between the predicted tristimulus values and the measured values can be reduced further.

Embodiment 5.

In Embodiment 4, the formula (9) was used to calculate the predicted tristimulus values X, Y and Z from the predicted monochromatic tristimulus values Xr, Yr, Zr, Xg, Yg, Zg, Xb, Yb, and Zb. The predicted tristimulus values X, Y, and Z can be determined using other formulae.

The following formula (4) is for determining the predicted tristimulus values X, Y, and Z according to Embodiment 5 of the present invention. In the formula (4), Eik (i=1 to 3, k=1 to 30) are coefficients. The predicted monochromatic tristimulus values are determined using the formulae (21), (22) and (23) as in Embodiment 4. The processings other than the determination of the predicted tristimulus values are identical to those in Embodiment 4.

$$\begin{bmatrix} X \\ Y \\ Z \end{bmatrix} = (Eik) \begin{bmatrix} Xr \\ Xg \\ Xb \\ Xr^2 \\ Xg^2 \\ Xb^2 \\ Xr \times Xg \\ Xg \times Xb \\ Xb \times Xr \\ Xr \times Xg \times Xb \\ Yr \\ Yg \\ Yb \\ Yr^2 \\ Yg^2 \\ Yb^2 \\ Yr \times Yg \\ Yg \times Yb \\ Yb \times Yr \\ Yr \times Yg \times Yb \\ Zr \\ Zg \\ Zb \\ Zr^2 \\ Zg^2 \\ Zb^2 \\ Zr \times Zg \\ Zg \times Zb \\ Zb \times Zr \\ Zr \times Zg \times Zb \end{bmatrix} + \begin{bmatrix} Xbk \\ Ybk \\ Zbk \end{bmatrix} \quad (4)$$

Where the formulae (21), (22), and (23) were used to calculate the predicted monochromatic tristimulus values, and the formula (4) was used to calculate the predicted tristimulus values from the predicted monochromatic tristimulus values, for a certain liquid crystal display device, the average value of the color differences between the predicted tristimulus values and the measured values, according to the color difference formula based on the CIE1976 L*a*b* color system was 0.59, and the maximum value thereof was 7.93. The color difference was determined for 159 colors shown in FIG. 7, as it was for the Embodiment 4.

When the color conversion characteristic determining method according to Embodiment 4 was applied to the same liquid crystal display device, and the formulae (21), (22), and (23) were used to calculate the predicted monochromatic tristimulus values, and the formula (9) was used to calculate the predicted tristimulus values from the predicted monochromatic tristimulus values, the average value of the color differences between the predicted tristimulus values and the measured values determined according to the color difference formula based on the CIE1976 L*a*b* color system was 1.13, and its maximum was 4.17.

As has been described, by using the formulae (4) to calculate the predicted tristimulus values X, Y, and Z, the average value of the color differences between the predicted tristimulus values and the measured values can be reduced further. In other words, the general accuracy of determining the predicted tristimulus values can be improved.

Embodiment 6.

In Embodiment 5, the formula (4) was used to calculate the predicted tristimulus values X, Y and Z from the predicted monochromatic tristimulus values Xr, Yr, Zr, Xg, Yg, Zg, Xb, Yb, and Zb. The predicted tristimulus values X, Y, and Z can be determined using other formulae.

The following formula (5) is for determining the predicted tristimulus values X, Y, and Z according to Embodiment 5 of the present invention. In the formula (5), Eik (i=1 to 3, k=1 to 39) are coefficients. The predicted monochromatic tristimulus values are determined using the formulae (21), (22) and (23) as in Embodiment 5. The processings other than the determination of the predicted tristimulus values are identical to those in Embodiment 5.

$$\begin{bmatrix} X \\ Y \\ Z \end{bmatrix} = (Eik) \begin{bmatrix} Xr \\ Xg \\ Xb \\ Xr^2 \\ Xg^2 \\ Xb^2 \\ Xr \times Xg \\ Xg \times Xb \\ Xb \times Xr \\ \sqrt{Xr \times Xg} \\ \sqrt{Xg \times Xb} \\ \sqrt{Xb \times Xr} \\ Xr \times Xg \times Xb \\ Yr \\ Yg \\ Yb \\ Yr^2 \\ Yg^2 \\ Yb^2 \\ Yr \times Yg \\ Yg \times Yb \\ Yb \times Yr \\ \sqrt{Yr \times Yg} \\ \sqrt{Yg \times Yb} \\ \sqrt{Yb \times Yr} \\ Yr \times Yg \times Yb \\ Zr \\ Zg \\ Zb \\ Zr^2 \\ Zg^2 \\ Zb^2 \\ Zr \times Zg \\ Zg \times Zb \\ Zb \times Zr \\ \sqrt{Zr \times Zg} \\ \sqrt{Zg \times Zb} \\ \sqrt{Zb \times Zr} \\ Zr \times Zg \times Zb \end{bmatrix} + \begin{bmatrix} Xbk \\ Ybk \\ Zbk \end{bmatrix} \quad (5)$$

Where the formulae (21), (22), and (23) were used to calculate the predicted monochromatic tristimulus values, and the formula (5) was used to calculate the predicted tristimulus values from the predicted monochromatic tristimulus values, for a certain liquid crystal display device, the average value of the color differences between the predicted tristimulus values and the measured values, according to the color difference formula based on the CIE1976 L*a*b* color system was 0.52, and the maximum value thereof was 5.50. The color difference was determined for 159 colors shown in FIG. 7, as it was for the Embodiment 5.

When the color conversion characteristic determining method according to Embodiment 5 was applied to the same liquid crystal display device, and the formulae (21), (22), and (23) were used to calculate the predicted monochromatic tristimulus values, and the formula (4) was used to calculate the predicted tristimulus values from the predicted monochromatic tristimulus values, the average value of the color differences between the predicted tristimulus values and the measured values determined according to the color difference formula based on the CIE1976 L*a*b* color system was 0.59, and its maximum was 7.93.

Figure 9:
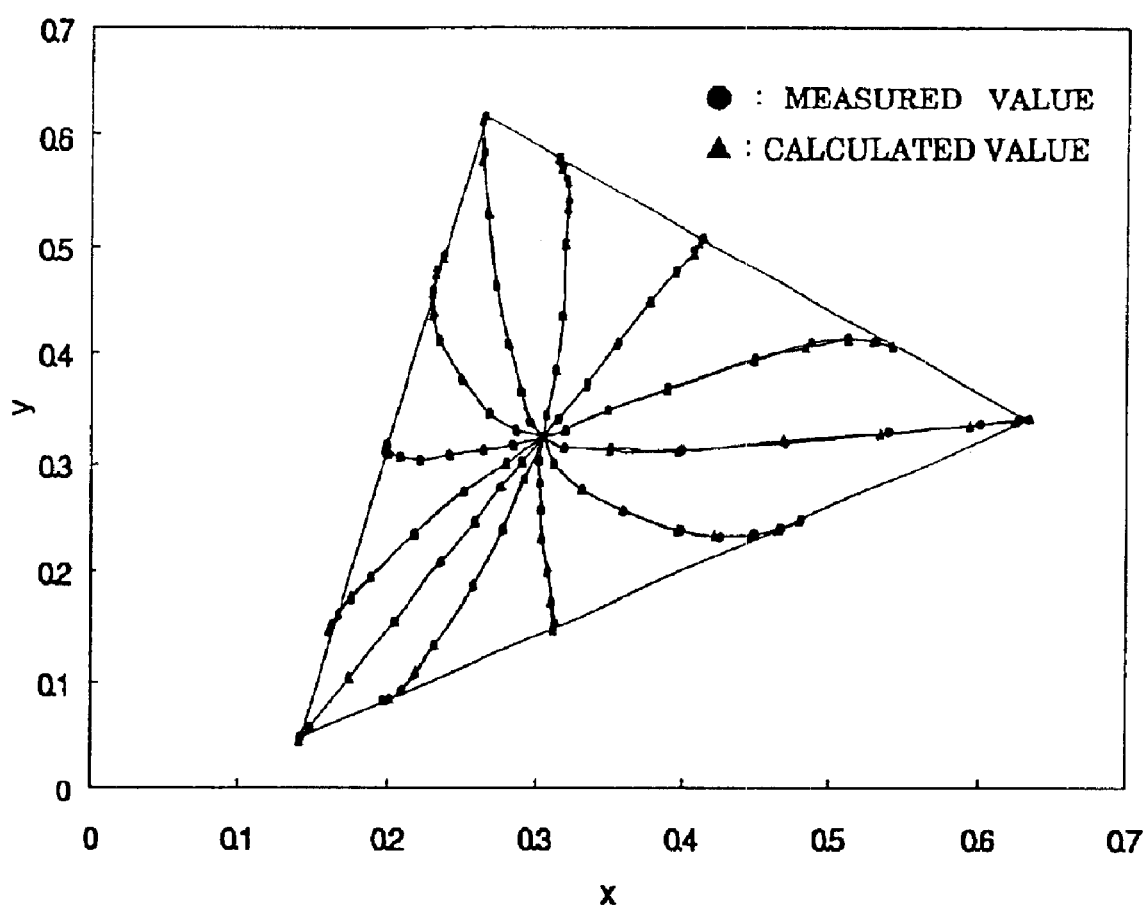
FIG. 9 an XY chromaticity diagram showing the predicted tristimulus values as determined by the formula in the color conversion characteristic determining method according to Embodiment 6 of the present invention, and the measured values.
Figure 10:
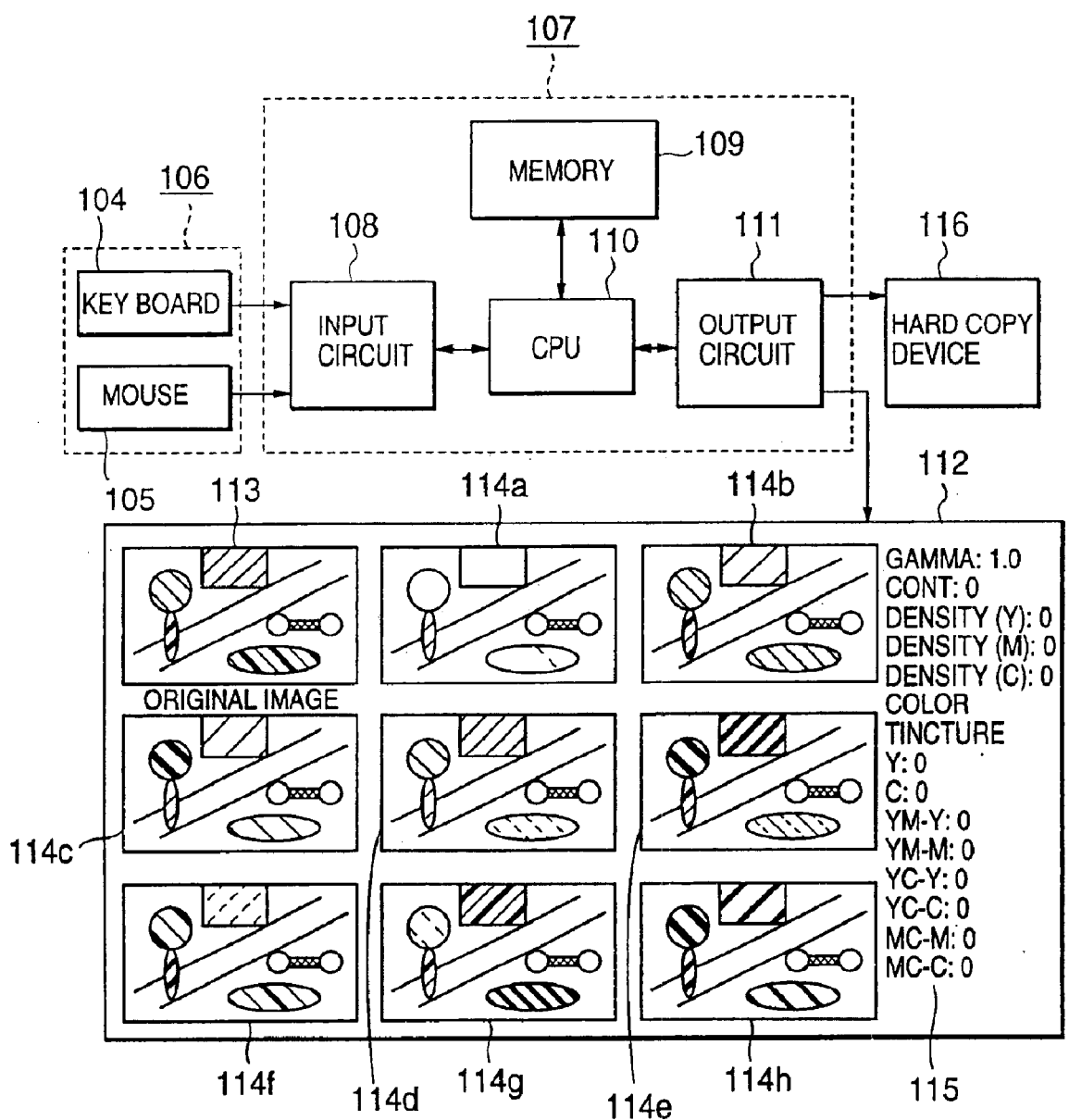
FIG. 10 is a diagram showing an example of conventional color conversion characteristic determining method.

FIG. 9 is an xy chromaticity diagram showing the results of the calculation of the predicted tristimulus values according to the color conversion characteristic determining method of the present embodiment, and the measured values. It is seen that the predicted tristimulus values and the measured values are fairly close to each other.

As has been described, by using the formulae (5) to calculate the predicted tristimulus values X, Y, and Z, the average value and the maximum value of the color differences between the predicted tristimulus values and the measured values can be reduced further. In other words, the accuracy of determining the predicted tristimulus values can be improved.

In the various embodiments, the measurement of the characteristic of the image display means is performed for 120 colors, and the calculation of the predicted tristimulus values for the determination of the color conversion characteristic is performed for 60 colors. The invention is not limited to these numbers of colors. For instance, the measurement of the characteristic of the image display means may be conducted for 159 colors shown in FIG. 5.

What is claimed is:

1. An apparatus for determining a color conversion characteristic, the apparatus comprising:
   an image display unit for displaying converted image data;
   a holding unit for storing a conversion characteristic; and
   a color conversion unit for performing color conversion on input image data based on the conversion characteristic stored in the holding unit, and for outputting the converted image data to the image display unit,
   wherein the color conversion unit selects a color conversion candidate,
   wherein the color conversion unit calculates predicted tristimulus values based on predicted color data,
   wherein the color conversion unit evaluates the predicted tristimulus values based on measured tristimulus values and the selected color conversion candidate, and
   wherein the color conversion unit determines, on the basis of the evaluation of the predicted tristimulus values, whether or not the color conversion candidate that was selected is stored in the holding unit as the conversion characteristic.

2. The apparatus according to claim 1, further comprising an input image data processing unit for performing tone correction on the input image data.

3. The apparatus according to claim 1, wherein the input image data is formed of three color data.

4. The apparatus according to claim 3, wherein the three color data includes red, green, and blue.

5. The apparatus according to claim 1, wherein the color conversion unit utilizes a look-up table for performing the color conversion of the input image data.

6. The apparatus according to claim 1, wherein the color conversion unit utilizes a matrix calculator for performing the color conversion of the input image data.

7. The apparatus according to claim 6, wherein coefficients forming coefficient matrixes for the matrix calculator are changed in determining the color conversion characteristic.

8. The apparatus according to claim 1, wherein the color conversion candidate is selected on the basis of a previously determined color conversion characteristic or on the basis of a standard color conversion characteristic.

9. The apparatus according to claim 1, wherein the predicted color data are calculated based on the color conversion candidate and generated sets of input image data.

10. The apparatus according to claim 1, wherein the predicted tristimulus values are calculated on the further basis of predicted image display data.

11. The apparatus according to claim 1, wherein the measured tristimulus values have been measured previously or are current measured tristimulus values, depending on whether or not the image display device has been altered.

12. The apparatus according to claim 1, wherein the evaluation of the predicted tristimulus values is performed by calculating target tristimulus values on the basis of generated input image data, calculating color differences between the target tristimulus values and predicted tristimulus values, and comparing the color differences to reference values.

13. The apparatus according to claim 1, wherein the color conversion candidate that was selected is modified on the basis of the determination of the evaluation of the predicted tristimulus values.

* * * * *